United States Patent [19]

Endo

[11] Patent Number: 4,552,456

[45] Date of Patent: Nov. 12, 1985

[54] OPTICAL PULSE RADAR FOR AN AUTOMOTIVE VEHICLE

[75] Inventor: Hiroshi Endo, Yokosuka, Japan

[73] Assignee: Nissan Motor Company, Limited, Japan

[21] Appl. No.: 411,813

[22] Filed: Aug. 26, 1982

[30] Foreign Application Priority Data

Oct. 31, 1981 [JP] Japan .................. 56-173729

[51] Int. Cl.$^4$ ............... G01C 3/08; G01P 3/36
[52] U.S. Cl. ..................... 356/5; 356/28.5; 343/9 PS; 343/10; 343/12 R
[58] Field of Search ............ 356/5, 28, 28.5; 343/9 PS, 10, 12 R

[56] References Cited

U.S. PATENT DOCUMENTS

| | | | |
|---|---|---|---|
| 3,820,896 | 6/1974 | Stavis | 356/28.5 |
| 3,825,340 | 7/1974 | Debart | 356/28.5 X |
| 3,841,755 | 10/1974 | Debart | 356/28.5 |
| 3,866,055 | 2/1975 | Pike | 356/28.5 X |
| 3,897,150 | 7/1975 | Bridges et al. | 356/5 |
| 4,190,361 | 2/1980 | Dubrunfaut | 356/28 X |
| 4,190,362 | 2/1980 | Dubrunfaut | 356/5 |
| 4,466,738 | 8/1984 | Huang et al. | 356/28.5 X |

FOREIGN PATENT DOCUMENTS

| | | |
|---|---|---|
| 625034 | 6/1949 | United Kingdom . |
| 655396 | 7/1951 | United Kingdom . |
| 663611 | 12/1951 | United Kingdom . |
| 1202612 | 8/1970 | United Kingdom . |
| 2008884 | 6/1979 | United Kingdom . |
| 2048603 | 12/1980 | United Kingdom . |
| 2108348 | 5/1983 | United Kingdom . |

OTHER PUBLICATIONS

M. Skolnik Radar Handbook M.G.H. (1970) pp. 35-37, to 37-39.
The Radar Handbook, Merrill I. Skolnick, McGraw-Hill Co. pp. 28, 29.
Introduction to Radar Systems, Merrill I. Skolnick—McGraw-Hill Co. pp. 77, 78 (1962).

*Primary Examiner*—S. C. Buczinski
*Assistant Examiner*—John B. Sotomayor
*Attorney, Agent, or Firm*—Lane and Aitken

[57] ABSTRACT

An optical pulse radar for an automotive vehicle of heterodyne detection-type which can detect an object ahead of the vehicle with an improved S/N radio even under the worst detection conditions in which sunlight or a strong headlight beam from a car is directly incident thereupon. The optical pulse radar according to the present invention comprises a laser system, a beam splitter for obtaining a carrier beam and a heterodyne beam, a beam deflector, a beam modulator, a beam mixer for obtaining a beat beam signal, a beam sensor and, a beat signal processing section, etc. An optical IC may incorporate the beam splitter and mixer, the beam modulator, and the beam deflector in order to miniaturize the system, while improving the sensitivity, reliability, massproductivity, and cost.

15 Claims, 15 Drawing Figures

FIG. 6

CARRIER BEAM $B_c$ & HETERODYNE BEAM $B_H$ : $f_l$

F-CONVERTED (DIFFRACTED) BEAM $B_F$ : $f_f = f_l + f_o$

MODULATING SIGNAL $e_m$ (TRIGGER SIGNAL $e_t$)

P-MODULATED F-CONVERTED TRANSMISSION BEAM $B_T$ : $f_T = f_l + f_o$

RECEIVED BEAM $B_R$ : $f_R = f_l + f_o + f_d$

INTERFERENCE BEAT SIGNAL $e_b$ : $f_b = f_o + f_d$

DETECTION SIGNAL $e_d$ $T_P$, $T_w$, $\tau$

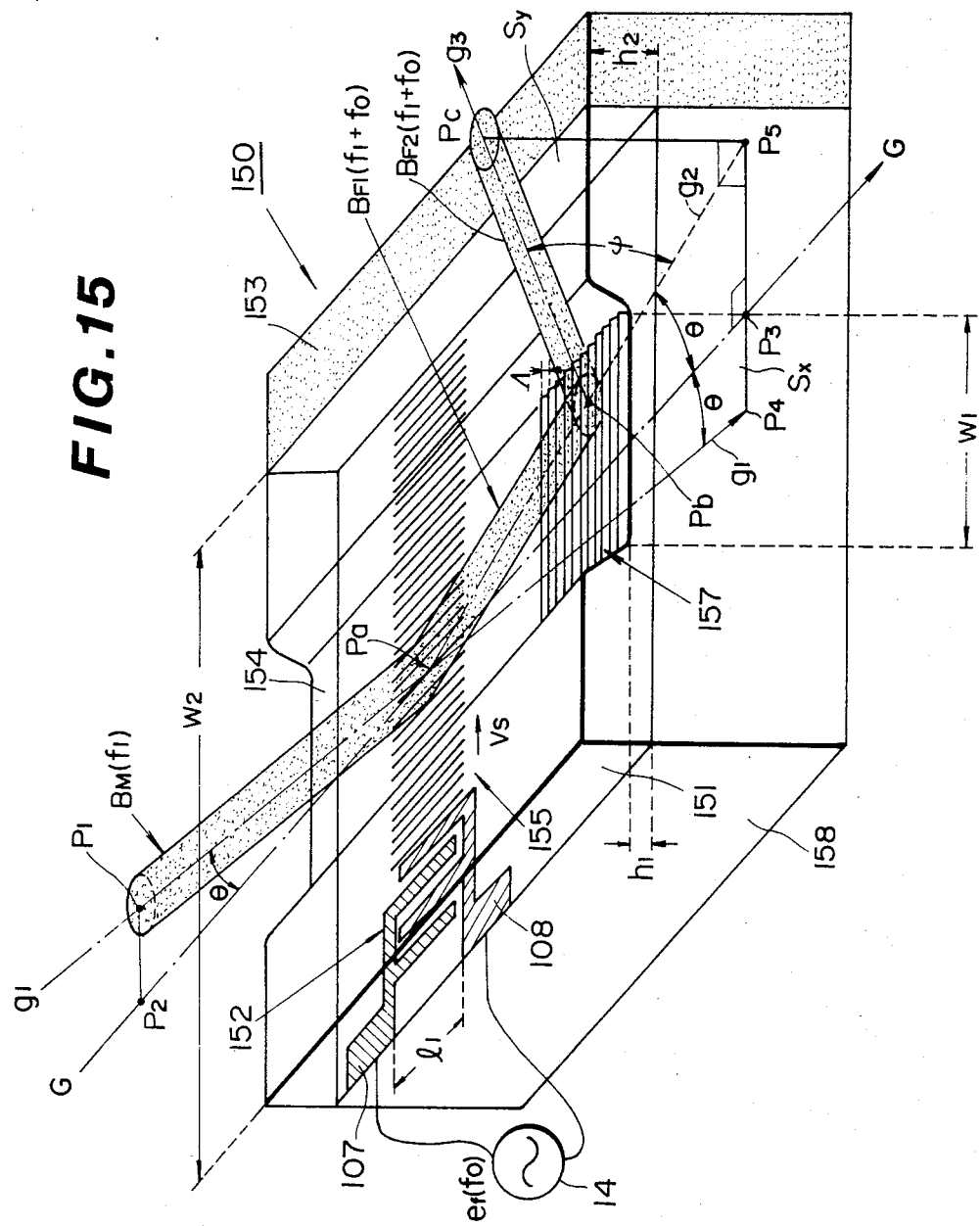

OPTICAL PULSE RADAR FOR AN AUTOMOTIVE VEHICLE

BACKGROUND OF THE INVENTION

1. Field of the Invention

The present invention relates generally to an optical pulse radar or an OPDAR (optical direction and ranging) for an automotive vehicle, and particularly to an optical pulse radar of the heterodyne detection type for use in a collision prevention system mounted in an automotive vehicle, which can reduce the influence of background optical noise.

2. Description of the Prior Art

Conventionally, there is a well-known optical pulse radar or an OPDAR for an automotive vehicle which can detect an obstruction ahead of the vehicle on the basis of the delay time from when a laser beam is transmitted to when the laser beam is received. Such systems are capable of obtaining various information such as a distance to the obstruction, a relative velocity with respect to the obstruction, the orientation to the obstruction, and the like. In the prior-art optical pulse radar for an automotive vehicle, however, since the background optical noise included in the received laser beam is reduced by passing the received beam only through an optical filter, the S/N ratio at a beam sensor is sometimes not sufficiently high. In order to improve the S/N ratio, it is necessary to reduce the pass bandwidth of the filter; however, there exists a limit from the standpoint of manufacturing precision. On the other hand, when the background optical noise is the sunlight directly or indirectly incident upon the beam receiving device of the optical radar, there inevitably exists a problem in that the S/N ratio is smaller than one; that is, it is impossible to detect the laser beam reflected from an obstruction.

The arrangement and the problems of the prior-art pulse radar for an automotive vehicle will be described in more detail and expressed numerically hereinafter with reference to the attached drawings under DETAILED DESCRIPTION OF THE PREFERRED EMBODIMENTS.

SUMMARY OF THE INVENTION

With these problems in mind therefore, it is the primary object of the present invention to provide an optical pulse radar for an automotive vehicle with improved S/N ratio, sensitivity, reliability, and the like. This object is generally achieved by reducing the influence of background optical noise even under the most adverse detection conditions in which sunlight or a strong headlight beam from a car moving in the opposite direction is directly incident upon the optical receiver.

It is another object of the present invention to provide an optical pulse radar for an automotive vehicle which is small in size, light in weight, and reasonably inexpensive to manufacture.

To achieve the above-mentioned objects, the optical pulse radar for an automotive vehicle according to the present invention comprises a laser system, a beam splitter for dividing a laser beam into a carrier beam and a heterodyne beam, a beam deflector for frequency-converting the split carrier beam, a beam modulator for pulse-modulating the frequency-converted beam into a pulsed transmission beam, a beam mixer for mixing the splitted heterodyne beam and the received beam reflected from an object to obtain a beam interference signal, a beam sensor, a beat signal processing section, etc.

In particular, since an optical integrated circuit including a directional coupler-type beam splitter and mixer, a directional coupler-type electrooptic beam modulator and a surface acoustic type (acoustooptic) beam deflector is incorporated therein, it is possible to minimize the system, while improving the sensitivity, reliability, mass productivity, manufacturing cost, etc.

BRIEF DESCRIPTION OF THE DRAWINGS

The features and advantages of the optical pulse radar for an automotive vehicle according to the present invention will be more clearly appreciated from the following description taken in conjunction with the accompanying drawings in which like reference numerals designate corresponding elements or sections throughout the drawings and in which;

FIG. 6 is a timing chart for the first embodiment of the optical pulse radar for an automotive vehicle according to the present invention of FIG. 5, in which optical and electrical signal waveforms at essential sections are illustrated;

FIG. 15 is an enlarged perspective view showing the configuration of the acoustooptic waveguide type beam deflector used in the optical integrated circuit of FIG. 13.

DETAILED DESCRIPTION OF THE PREFERRED EMBODIMENTS

To facilitate understanding of the present invention, reference will first be made to a typical prior-art optical pulse radar with respect to its application to an automotive vehicle, with reference to the attached drawings.

Figure 1:
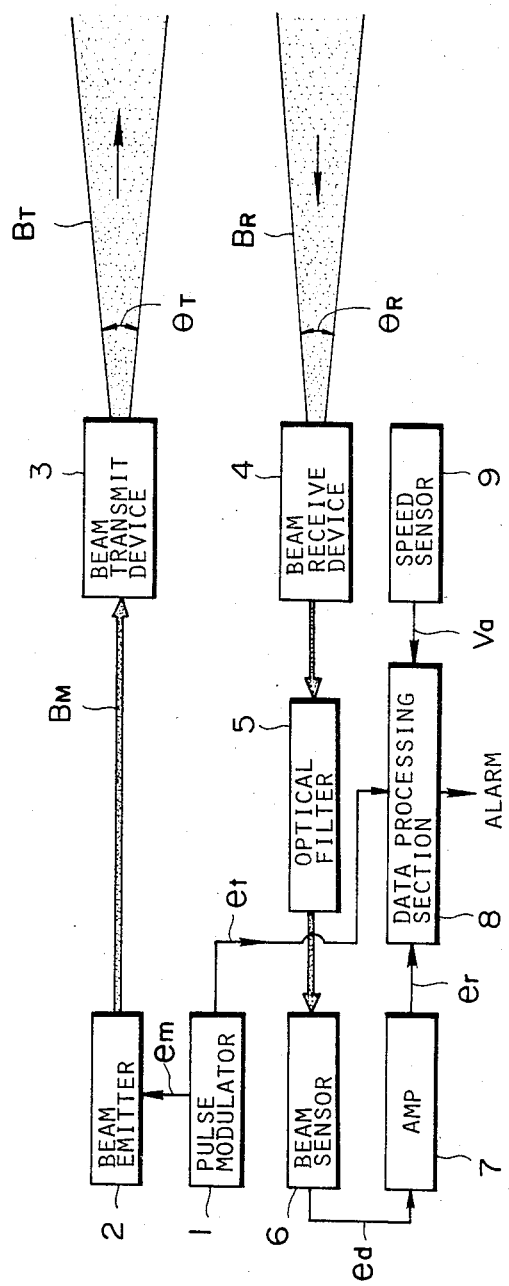
FIG. 1 is a schematic block diagram of a typical optical pulse radar for an automotive vehicle for assistance in explaining the operations thereof.

In FIG. 1, the beam transmission section comprises a pulse modulator 1, a beam emitter 2, and a beam transmitting device 3. On the other hand, the beam reception section comprises a beam-receiving device 4, an optical filter 5, a beam sensor 6, a wide-band amplifier 7, a data processing section 8, and a vehicle speed sensor 9.

Figure 2:
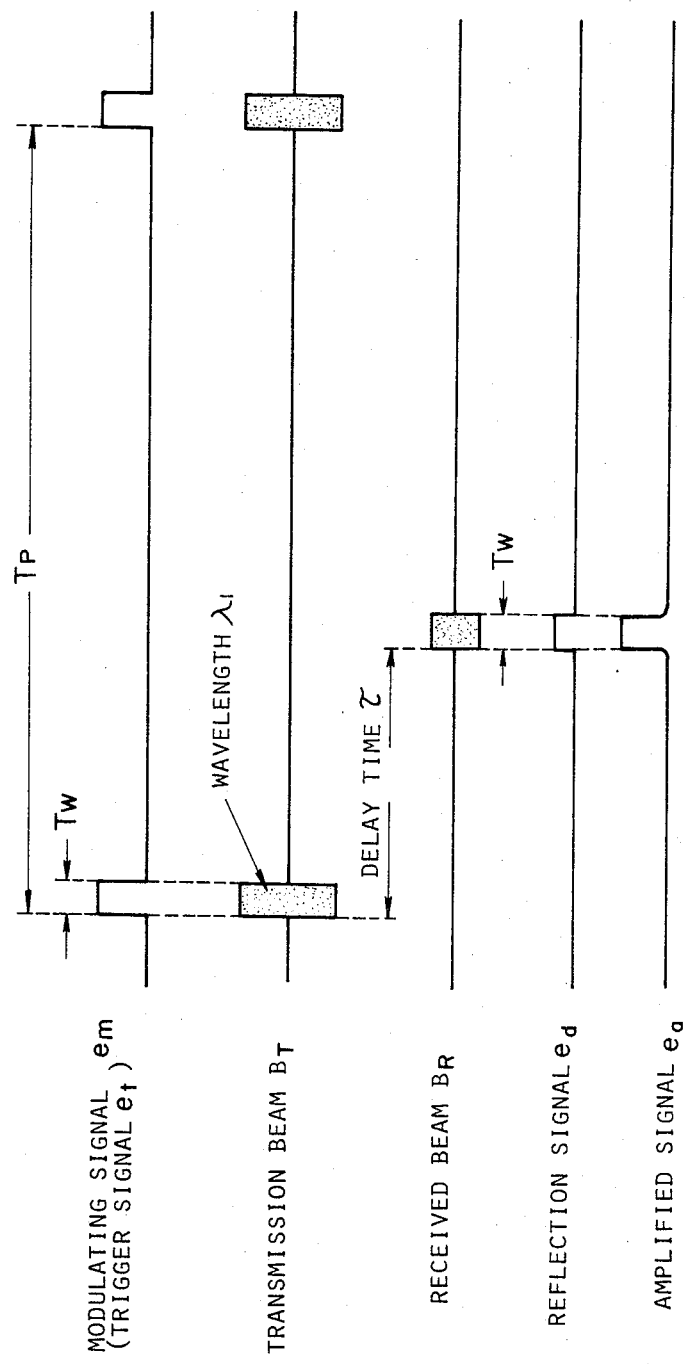
FIG. 2 is a timing chart for the prior-art optical pulse radar for an automotive vehicle of FIG. 1, in which optical and electrical signal waveforms at essential sections are illustrated.

The operations will be described with reference to the timing chart of FIG. 2. A modulating signal $e_m$ with pulse width $T_W$ and period $T_P$ is outputted from the pulse modulator 1. In response to this signal $e_m$, the beam outputted from the beam emitter 2 is pulse-modulated to generate a pulsed transmission beam $B_M$ with pulse width $T_W$. The pulsed transmission beam $B_M$ is introduced into the beam transmitting device 3 to transmit a pulsed transmission beam $B_T$ with dispersion angle $\theta_T$ frontward. The pulsed transmission beam $B_T$ is reflected from an object and becomes a reception beam $B_R$ at a reception window angle $\theta_R$. The reception beam $B_R$ received by the beam receiving device 4 is introduced into the optical filter 5 with a $-3$ dB pass bandwidth $\lambda_f$ to reduce background optical noise from the received beam $B_R$ and then is introduced into the beam sensor 6. The beam sensor 6 transduces the received beam $B_R$ into a corresponding electrical signal $e_d$. The detected signal $e_d$ is inputted to the wide-band amplifier 7 and amplified to a predetermined level as a reflection signal $e_r$ with pulse width $T_W$. Receiving a trigger signal $e_t$ from the pulse modulator 1 in synchronization with the modulating signal $e_m$ and a reflection signal $e_r$ from the wide-band amplifier 7, the data processing section 8 measures a delay time $\tau$ between the transmitted beam $B_T$ and the received beam $B_R$ by means of a high-speed counter provided therein, calculates various obstruction information such as the distance R to the object ($C \cdot \tau/2$, C: light speed), the relative speed $V_r(dR/dt)$, the orientation toward the object by means of a microcomputer also provided therein, receives current vehicle speed information $V_a$ detected by the vehicle speed sensor 9, determines the possibility of collision with the detected object, and outputs an audible alarm is necessary.

Figure 3:
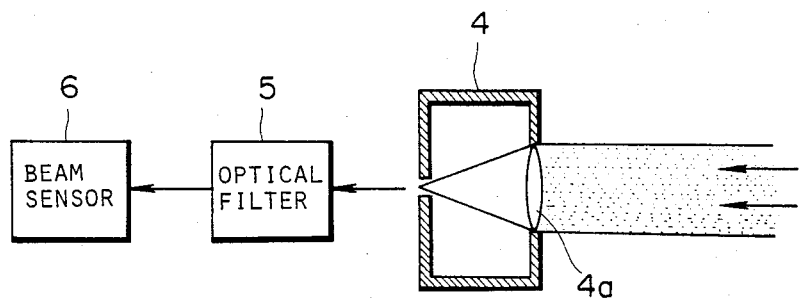
FIG. 3 is a schematic block diagram of the beam-receiving device used in the prior-art optical pulse radar for an automotive vehicle of FIG. 1.

In the prior-art optical pulse radar for an automotive vehicle, since the background optical noise included in the received beam $B_R$ is reduced by passing the received light $B_R$ only through the optical filter 5, the background optical noise power $P_N$ (mw) in the beam sensor b can be expressed as follows:

$$P_N = S_r \times (L_1 \times L_2) \times \lambda_f \times D_n \tag{1}$$

where $S_r$ denotes the light-receiving area (cm²) of a lens 4a of the beam receiving device 4 as depicted in FIG. 3, $L_1$ denotes the power loss caused when the beam passes through the lens $4a$, $L_2$ denotes the power loss caused when the beam passes through the optical filter 5, $\lambda_f$ (μm) denotes the $-3$ dB pass bandwidth of the optical filter 5, and $D_n$ denotes the background optical noise power density (mw/cm²·μm) per wavelength $\lambda$ of the received beam $B_R$.

On the other hand, when the intensity of the beam $B_R$ reflected from an object is $p_r$ (mw/cm²), the received signal power $P_R$ of the received beam $B_R$ in the beam sensor 6 can be expressed as follows:

$$P_R = S_r(L_1 \times L_2) \cdot p_r \tag{2}$$

Therefore, the S/N ratio in the light reception area of the beam sensor 6 can be given by the following expression derived from the above expressions (1) and (2):

$$S/N = P_R/P_N = [p_r/(\lambda_f D_n)] \tag{3}$$

In order to increase the S/N ratio given by the above expression (3), although it is necessary to reduce the $-3$ dB pass bandwidth $\lambda_f$ of the optical filter 5, the minimum value thereof being approximately 10 Å $= 10^{-3}$ μm, because of the precision limit or the yield rate limit inherent in the manufacture of the interference filter most often used for this purpose.

Figure 4:
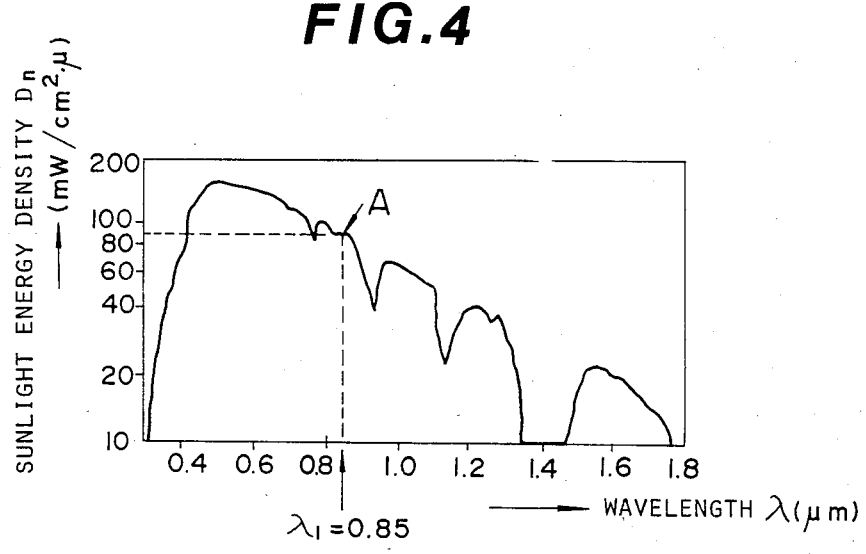
FIG. 4 is a graphical representation showing the optical energy spectrum density of the sunlight considered as background optical noise with regard to the optical pulse radar for an automotive vehicle.

Since the wavelength $\lambda$ of the beam generated from the beam emitter 2, for instance, such as a popular light emitting diode or a semiconductor laser, is approximately 0.85 μm, in the case where the background optical noise is sunlight, with the maximum power density as shown in FIG. 4 and further the maximum intensity sunlight is incident upon the optical radar receiver directly or after having been reflected from around an object, the above-mentioned background optical noise power density $D_n$ obtained at point A in FIG. 4 is about 90 mw/cm²·μm. Therefore, if the $-3$ dB pass bandwidth $\lambda_f$ of the optical filter 5 is 10 Å $= 10^{-3}$ μm, the background optical noise intensity $p_n$ per area included in the received beam $B_R$ outputted from the optical filter 5 can be obtained as follows:

$$p_n = \lambda \cdot D_n = 9 \times 10^{-2} \text{ mw/cm}^2$$

On the other hand, since the beam power $P_T$ transmitted from the beam emitter 2 is 100 mw at the highest and since the intensity $p_r$ of the beam $B_R$ reflected from an object several tens meters ahead and on or near a road, for instance, such as another automotive vehicle, a pedestrian, an electric post, a sign board, a billboard, a guard rail, a bridge railing, etc. is approximately $10^{-2}$ to $10^{-4}$ (mw/cm²), the S/N ratio can be obtained from the expression (3) as follows:

$$S/N = P_R/P_N = \frac{p_r}{\lambda_f \cdot D_n} = \frac{10^{-2} \text{ to } 10^{-4} \text{ (mw/cm}^2)}{10^{-3} \text{ (μm)} \times 90 \text{ (mw/cm}^2/\text{μm)}}$$

$$= 10^{-1} \text{ to } 10^{-3}$$

Since the S/N ratio is smaller than one, the received signal power $P_R$ is totally masked by the background optical noise power $P_N$, thus causing the problem that it is impossible to detect the laser beam reflected from an object.

As described above, in the prior-art optical pulse radar for an automotive vehicle which directly detects the received beam, since there exists a manufacturing limit in the pass bandwidth of the optical filter and since it is impossible to reduce the pass bandwidth without limit from the standpoint of stability of the wavelength of the laser beam (the wavelength usually changes 3 Å/°C. in a semiconductor laser), in the case where the sunlight is directly incident upon the beam receiving device or indirectly incident thereupon after having been reflected by an object or a strong headlight beam from a car moving in the opposite direction is incident thereupon at night, the beam reflected from an obstruction several tens of meters ahead is completely masked by the background optical noise.

Figure 5:
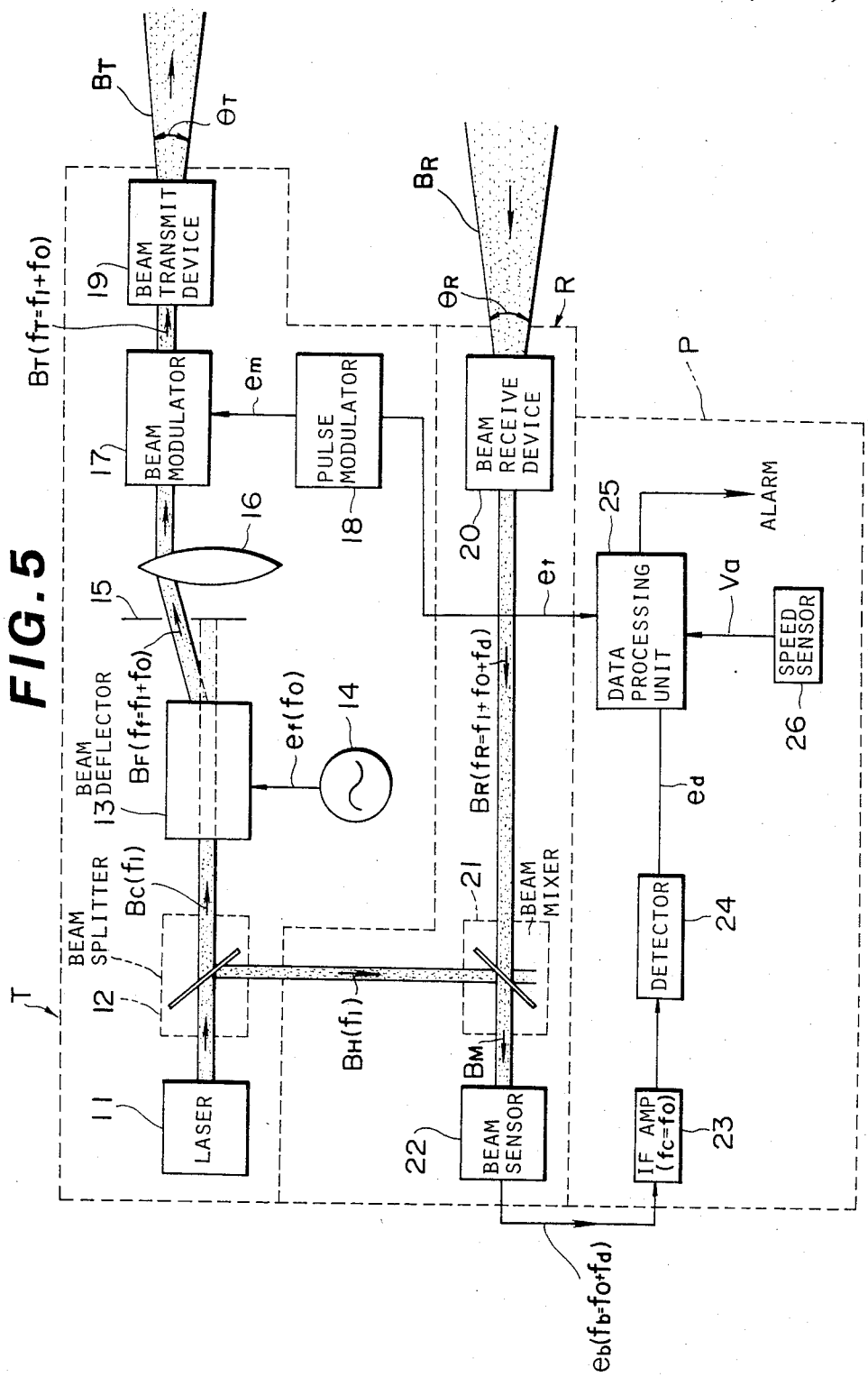
FIG. 5 is a schematic block diagram of a first embodiment of the optical pulse radar for an automotive vehicle according to the present invention.
Figure 7:
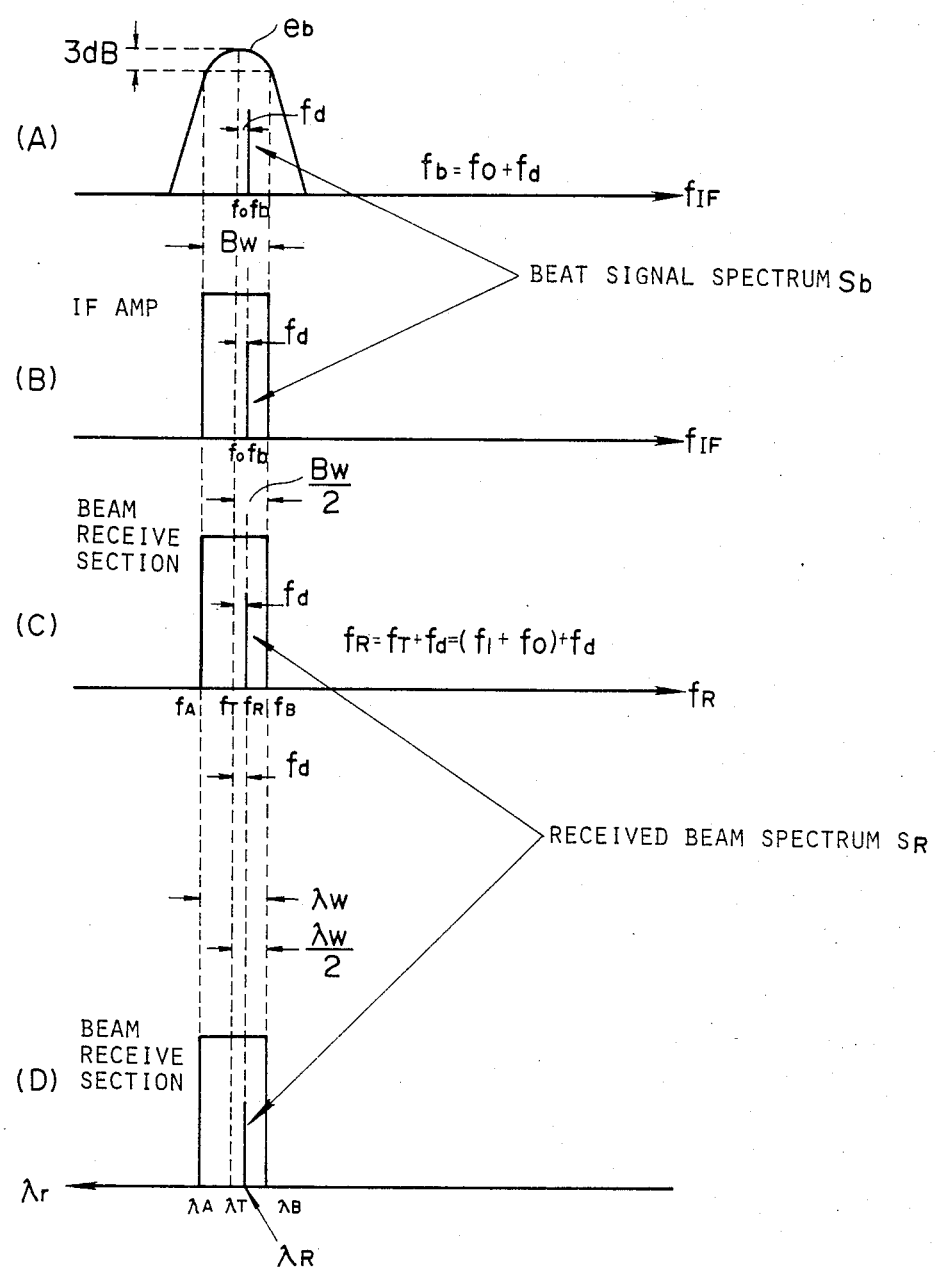
FIG. 7 is a graphical representation showing the mutual relationships between the frequency (or wavelength) characteristics of detected beat signal, intermediate-frequency, and beam receive section in the first embodiment of the optical pulse radar for an automotive vehicle according to the present invention of FIG. 5.

In view of the above description, reference is now made to a first embodiment of the optical pulse radar for an automotive vehicle according to the present invention with reference to FIGS. 5, 6, and 7.

In FIG. 5, the beam transmitting section T comprises a laser 11 for outputting a coherent laser beam with a single wavelength $\lambda_1$, a beam splitter 12 for splitting the laser beam outputted from the laser 11 into a carrier beam $B_C$ and a heterodyne beam $B_H$, a beam deflector 13 for deflecting the carrier beam $B_C$ outputted from the beam splitter 12 in accordance with a high-frequency signal $e_f$ with a frequency $f_o$ generated by a high-frequency generator 14 in order to shift the frequency $f_1$ of the carrier beam $B_C$ by $f_o$, a collimator 15, a lens 16, a beam modulator 17 for modulating the frequency-converted beam $B_F$ outputted from the beam deflector 13 into a pulsed laser beam $B_T$ with pulse width $T_W$ and period $T_p$ in accordance with a pulse modulating signal $e_m$ outputted from a pulse modulator 18, and a beam transmitting device 19 for transmitting a transmission beam $B_T$ at dispersion angle $\theta_T$.

The beam receiving section R comprises a beam receiving device 20 for receiving the pulsed laser beam $B_R$ reflected from an object with a reception window angle $\theta_R$, a beam mixer 21 for superimposing the split heterodyne laser beam $B_H$ upon the received pulsed laser beam $B_R$ for interferometric detection, and a beam sensor 22 for transducing the laser interference beat beam mixed with the received beam $B_R$ and the heterodyne beam $B_H$ into the corresponding electric signal $e_b$ with frequency $f_b$.

The signal processing section P comprises an intermediate-frequency amplifier 23 for amplifying the interference beat signal $e_b$ from the beam sensor 22, a detector 24 for detecting the signal from the intermediate-frequency amplifier 23 to generate a detection signal $e_d$, a data processing unit 25 for calculating data such as distance, relative speed, and orientation with respect to an object, in response to a trigger signal $e_t$ outputted from the pulse modulator 18 in synchronization with the pulse-modulating signal $e_m$, the detection signal $e_d$ from the detector 24, and an absolute vehicle speed signal $V_a$ detected by a vehicle speed sensor 26, in order to determine the possibility of danger such as collision with the object and to produce an audible alarm when necessary.

Now, a description of operations of the first embodiment according to the present invention shown in FIG. 5 will be made hereinbelow with reference to FIGS. 6 and 7.

In the beam transmitting section T, a coherent laser beam of wavelength $\lambda_1$ and frequency $f_1$ is generated by the laser 11, such as a semiconductor laser, solid laser, gas laser, or the like. The laser beam generated therefrom is introduced to the beam splitter 12 such as a half-silvered mirror, to split the laser beam into a carrier laser beam $B_C$ and a heterodyne laser beam $B_H$. The split carrier beam $B_C$ is introduced to the beam deflector 13, such as an acoustooptic beam deflector of surface acoustic wave-type (explained in more detail later). The beam deflector 13 superimposes the high-frequency signal $e_f$ with frequency $f_o$ from the high-frequency generator 14 upon the carrier beam $B_C$ with a frequency $f_1$. This is because the surface acoustic wave generated in an ultrasonic wave medium causes compressional waves which effect the local refractive index within the medium and thereby the laser beam incident upon the ultrasonic wave medium is diffracted.

To explain the operation of the beam deflector 13 in more detail, provided that the following Bragg diffraction condition between the incidence angle $\theta$ and the wavelength $\lambda_1$ of the laser beam with a frequency $f_1$ incident upon the wave surface of an ultrasonic wave with a frequency $f_o$ is satisfied:

$$\sin \theta = (\lambda_1/2) \cdot (f_o/V_A) \tag{4}$$

where $V_A$ denotes the speed of sound in the medium, the frequency $f_f$ of the diffracted (frequency-converted) laser beam $B_F$ can be expressed as follows, as is well-known:

$$f_f = f_1 + f_o \tag{5}$$

In this embodiment, since the frequency $f_o$ of the high-frequency signal $e_f$ is 300 MHz and the wavelength $\lambda_1$ of the carrier beam $B_C$ incident upon the wave surface of an ultrasonic wave is 0.85 μm, provided that the incidence angle $\theta$ is determined so as to satisfy the above expression (4), it is possible to output a frequency-converted laser beam $B_F$ with a frequency $f_f = f_1 + f_o$.

The frequency-converted, diffracted beam $B_F$ thus obtained passes through the collimator 15 to restrict the beam width and is introduced via the lens 16 to the beam modulator 17, which may be of an electrooptical effect-type, an acoustooptical effect type, a magnetooptical effect-type, etc., for pulse-modulating the laser beam $B_F$ into one with pulse width $T_W$ and period $T_p$ in accordance with a pulse-modulating signal $e_m$ with pulsewidth $T_W$ and period $T_P$ from the pulse modulator 18. The pulse-modulated transmission beam $B_T$ (pulsed laser beam) is then transmitted, in the direction in which the vehicle is travelling, from the beam transmitting device 19 at a dispersion angle $\theta_T$. In this embodiment, however, it is of course possible to deflect a parallel laser beam to dispersion angle $\theta_T$ in order to obtain orientation information with respect to an object, when necessary.

The laser beam $B_R$ reflected from an object is received by the beam receiving device 20 with a light-receiving area S (cm$^2$). The received beam $B_R$ with frequency $f_R$ is introduced into the beam mixer 21 such as a half-silvered mirror in order to mix or superimpose the received beam $B_R$ with frequency $f_R$ upon the heterodyne beam $B_H$ with frequency $f_1$ from the beam splitter 12. The mixed beam $B_M$ is then introduced to the beam sensor 22, such as an avalanche photodiode, a photodiode, etc., to transduce the mixed beam $B_M$ into an electric interference beat signal $e_b$ with frequency $f_b$.

The frequency $f_R$ of the received beam $B_R$ can be derived by considering the influence of Doppler shift caused by the relative velocity $V_r$ between the object and the radar:

$$f_R = f_T + f_d \tag{6}$$

where the Doppler frequency $f_d$ is $$f_d = (2V_r/C) \cdot f_T \tag{7}$$

where C is light speed.

Therefore, the frequency $f_b$ of the beat signal $e_b$ is as follows:

$$f_b = f_R - f_1 = (f_1 + f_o + f_d) - f_1 = f_o + f_d \tag{8}$$

In this embodiment, since $f_o$ is 300 MHz and the wavelength $\lambda_T$ of the transmission beam $B_T$ is approximately 0.85 μm, assuming that $f_T$ is approximately $C/\lambda_1$ and $V_r$ is 100 km/h (28 m/s), the Doppler frequency $f_d$ is $$f_d = \frac{2V_r}{C} \cdot \frac{C}{\lambda_T} = \frac{2 \times 28}{0.85 \times 10^6} = 6.6 \times 10^7 = 66 \text{ MHz}$$

The Doppler frequency $f_d$ is 70 MHz at the most. Therefore, the frequency $f_b$ of the beat signal $e_b$ ranges as follows:

$$300 - 70 = 230 \text{ MHz} \leq f_b \leq 370 \text{ MHz} = 300 + 70$$

By presetting the central frequency $f_c$ of the intermediate-frequency amplifier 23 to amplify the beat signal $e_b$ to $f_c = f_o = 300$ MHz and the $-3$ dB pass bandwidth $B_W$ to 200 MHz, the beat signal $e_b$ can be amplified to a predetermined level through the intermediate-frequency amplifier 23 and the output signal is inputted to the detector 24 for envelope detection to obtain a detection signal $e_d$ with pulse width $T_W$.

On the other hand, a trigger signal $e_t$ generated in synchronization with the modulating signal $e_m$ is applied from the pulse modulator 18 to the data processing unit 25 together with the detection signal $e_d$. Therefore, in the data processing unit 25, in response to the trigger signal $e_t$ and the detection signal $e_d$, the propagation delay time τ between the transmitted beam $B_T$ and the received beam $B_R$ is measured by a high-speed counter provided therein, and the distance R to the object ($C \cdot \tau$)/2; C: light speed), the relative velocity $V_r$ with respect to the vehicle (dR/dt) and the orientation φ obtained by deflecting the transmitted beam, if necessary, are calculated by a microcomputer provided therein. Additionally, since the absolute vehicle speed $V_a$ is inputted from the vehicle speed sensor 26 to the data processing unit 25, it is also possible to determine the possibility of collision against the object and to generate an audible alarm if necessary.

As described above, in the first embodiment shown in FIG. 5, the laser beam with a frequency $f_1$ is divided into a carrier beam $B_C$ and a heterodyne beam $B_H$; the frequency $f_1$ of the carrier beam $B_C$ is converted into a frequency $f_1 + f_o$ in accordance with a high frequency signal $e_f$; the frequency-converted beam $B_F$ is pulse-modulated and transmitted in the direction in which the vehicle is travelling; the beam reflected from an object with a frequency $f_1 + f_o + f_d$ ($f_d$ is a Doppler frequency) is mixed with the heterodyne beam with a frequency $f_1$ for interferometric detection. Therefore, the frequency $f_o + f_d$ of the interference beat signal $e_b$ is almost independent of the frequency $f_1$ of the generated laser beam, that is, of the wavelength $\lambda_1$ of the generated laser beam, because $\lambda_1 f_1 = C$ (C: light velocity). Although the Doppler frequency $f_d$ can be expressed as $f_d = (2V_r/C) \cdot f_1$ and therefore is a function of both $\lambda_1$ and $V_r$ (relative velocity), since $f_o \gg f_d$, it is possible to neglect variation of Doppler frequency $f_d$.

In this invention, therefore, even if the wavelength $\lambda_1$ of the laser beam fluctuates due to change in temperature, supply voltage etc., the frequency $f_b$ of the beat signal $e_b$ outputted from the beam sensor remains almost constant; as a result, it is possible to reliably detect the delay time between the transmitted beam and the received beam.

Further, in the optical pulse radar according to the present invention, it is possible to reduce the reception bandwidth $\lambda_w$ with respect to the beam reflected from an object to as little as approximately 1/2000 of that in the prior-art optical pulse radar, as explained in more detail below.

In FIG. 7(A), the frequency characteristics of the beat signal $e_b$ are shown in solid lines. As already explained, since the frequency $f_b$ of the beat signal $e_b$ is $f_o + f_d$, the central frequency thereof is $f_o$.

When the beat signal $e_b$ passes through the intermediate-frequency amplifier with a $-3$ dB pass bandwidth $B_W$, the frequency characteristics can be shown as in FIG. 7(B).

On the other hand, since the beam-receiving section R mixes the received beam $B_R$ with frequency $f_R = f_1 + f_o + f_d$ (spectrum $S_R$) with heterodyne beam $B_H$ with frequency $f_1$ to generate a beat signal $e_b$ with frequency $f_b = f_o + f_d$ (spectrum $S_b$), if the frequency characteristics of the intermediate frequency amplifier 23 for amplifying the beat signal $e_b$ are assumed to be those shown in FIG. 7(B), the frequency characteristics of the beam receiving section R can be considered to be as shown in FIG. 7(C), the central frequency of which is $f_T$ and the pass bandwidth of which is $B_W$. Further, FIG. 7(D) shows the same frequency characteristics of the beam receiving section R as in FIG. 7(C), in which the frequency is converted into wavelength. Further, the labels $f_A$ and $f_B$ denote the lower and upper limits of the frequency bandwidth $B_W$ in FIG. 7(C); the labels $\lambda_A$ and $\lambda_B$ denote the lower and upper limits of the wavelength bandwidth $\lambda_W$ in FIG. 7(D). Since the wavelength $\lambda_A$ and $\lambda_B$ correspond to the frequency $f_A$ and $f_B$, respectively, the following relationships can be obtained:

$$f_A = \frac{C}{\lambda_A} \tag{9}$$

The wavelength $\lambda_B$ similarly corresponds to the frequency $f_B$.

With reference to FIGS. 7(C) and (D), $$f_A = f_T - \tfrac{1}{2}B_w \tag{10}$$
$$\lambda_A = \lambda_T + \tfrac{1}{2}\lambda_w \tag{11}$$

Therefore, from the expressions (9) and (11), $$f_A = \frac{C}{\lambda_T + \tfrac{1}{2}\lambda_w} \tag{12}$$

By substituting expression (12) and $f_T = (C/\lambda_T)$ into expression (10) and rearranging it, $$\frac{1}{2} B_w = \frac{C}{\lambda_T} - \frac{C}{\lambda_T + \frac{1}{2} \lambda_w} \quad (13)$$

since $\lambda_T >> \frac{1}{2} \lambda_w$, $$\frac{C}{\lambda_T + \frac{1}{2} \lambda_w} = \frac{C}{\lambda_T} \cdot \frac{1}{1 + \frac{\lambda_w}{2\lambda_T}} = \frac{C}{\lambda_T} \cdot \left(1 - \frac{\lambda_w}{2\lambda_T}\right) \quad (14)$$

By substituting expression (14) for (13), $$\tfrac{1}{2} B_w = \frac{C}{\lambda_T} - \frac{C}{\lambda_T} + \frac{C \cdot \lambda_w}{2\lambda_T{}^2} \quad (15)$$

Therefore, $\lambda_w = \dfrac{\lambda_T{}^2}{C} \cdot B_w$ is obtained.

On the other hand, since frequency $f_T$ of the transmission beam is $f_T = f_1 + f_o$ as expressed by expression (5), and since $$f_1 = \frac{C}{\lambda_1} = \frac{3 \times 10^8}{0.85} \times 10^6 = 3.5 \times 10^{14} \text{ Hz}$$

$$f_o = 300 \text{ MHz} = 3 \times 10^8 \text{ Hz}$$

$$f_1 >> f_o,$$

and since $f_T = f_1$ from the expression (5), $$\lambda_T = \lambda_1 \quad (16)$$

Therefore, by substituting expression (16) into (15), $$\lambda_w = \frac{\lambda_1{}^2}{C} \cdot B_w \quad (17)$$

can be obtained finally.

As described above, in the optical radar according to the present invention, it is possible to derive the reception bandwidth $\lambda_w$, as shown in expression (17), from the wavelength $\lambda_1$ of the laser beam and the $-3$ dB bandwidth $B_w$ of the intermediate frequency amplifier.

In the embodiment of FIG. 5, if $\lambda_1 = 0.85$ $\mu$m $= 8.5 \times 10^{-7}$ m, $B_w = 200$ MHz $= 2 \times 10^8$ Hz, light velocity C $= 3 \times 10^8$ m/sec., the reception bandwidth $\lambda_w$ is $$\lambda_w = \frac{(8.5 \times 10^{-7})}{3 \times 10^8} \times 2 \times 10^8 = 5 \times 10^{-13} \text{ m}$$

$$= 5 \times 10^{-3} \text{ (Å)}$$

from the expression (17).

As compared with the reception bandwidth $\lambda_w = \lambda_f = 10$(Å) of the prior-art radar, the reception bandwidth is reduced by about 1/2000; the background optical noise power $P_N$ obtained by substituting $\lambda_w$ for $\lambda_f$ in the expression (1) is also reduced by about 1/2000; the S/N ratio (the S/N ratio at the input terminal of the beam sensor) in the received beam, that is, $S/N = P_R/P_N$ ($P_R$ is the power of the beam reflected from an object) is increased by about 2000 times. Therefore, assuming the worst-case background optical noise in which sunlight is directly incident upon the optical receiver, in the case where the laser output is 100 mw, assuming that the signal intensity $p_r$ of the beam reflected from an object is $10^{-2}$ to $10^{-4}$ mw/cm$^2$, the background noise power density $D_n$ is 90 mw/cm$_2$.$\mu$m, and $\lambda_w$ is $5 \times 10^{-7}$ $\mu$m, and substituting $\lambda_w$ for $\lambda_f$ in expression (3), the S/N ratio of the received beam signal $B_R$ according to the present invention is $$S/N = P_R/P_N = \frac{p_r}{\lambda_w \cdot D_n} \quad (18)$$

$$S/N = \frac{10^{-2} \sim 10^{-4}}{5 \times 10^{-7} \times 90} = 2.2 \times 10^2 \sim 2.2 > 1$$

Therefore, S/N is usually greater than 1, indicating that it is possible to reliably detect the beam reflected from an object.

Since the S/N ratio with respect to the background optical noise in the received optical beam $B_R$ is 2000 times better than that of the prior-art optical radar as described above, it is possible for the object-detecting performance (relative sensitivity of optical radar determined by background optical noise power $P_N$) in normal background optical noise environments, e.g. the vehicle is travelling in a city in the daytime or at night, to be 2000 times better than that of the prior-art optical radar.

Furthermore, in this invention since the received beam signal obtained by receiving the beam reflected from an object is superimposed on the heterodyne beam which is a part of the source laser beam, it is possible to erase the influence of thermal noise in the load connected to the output of the beam sensor. Thus, the S/N ratio of the light-electricity transduced output signal in the beam sensor can be improved at least 10 dB as compared with that in the direct detection method in the prior-art optical radar.

Therefore, the minimum reception sensitivity of the radar is improved 10 dB or more as compared with that of the prior-art optical radar, and the object-detecting performance (detection limit for an object having weak photoreflective surfaces) in environments with almost no background optical noise (in dead darkness) can be improved 10 times or more as compared with that in prior-art optical radar.

Figure 8:
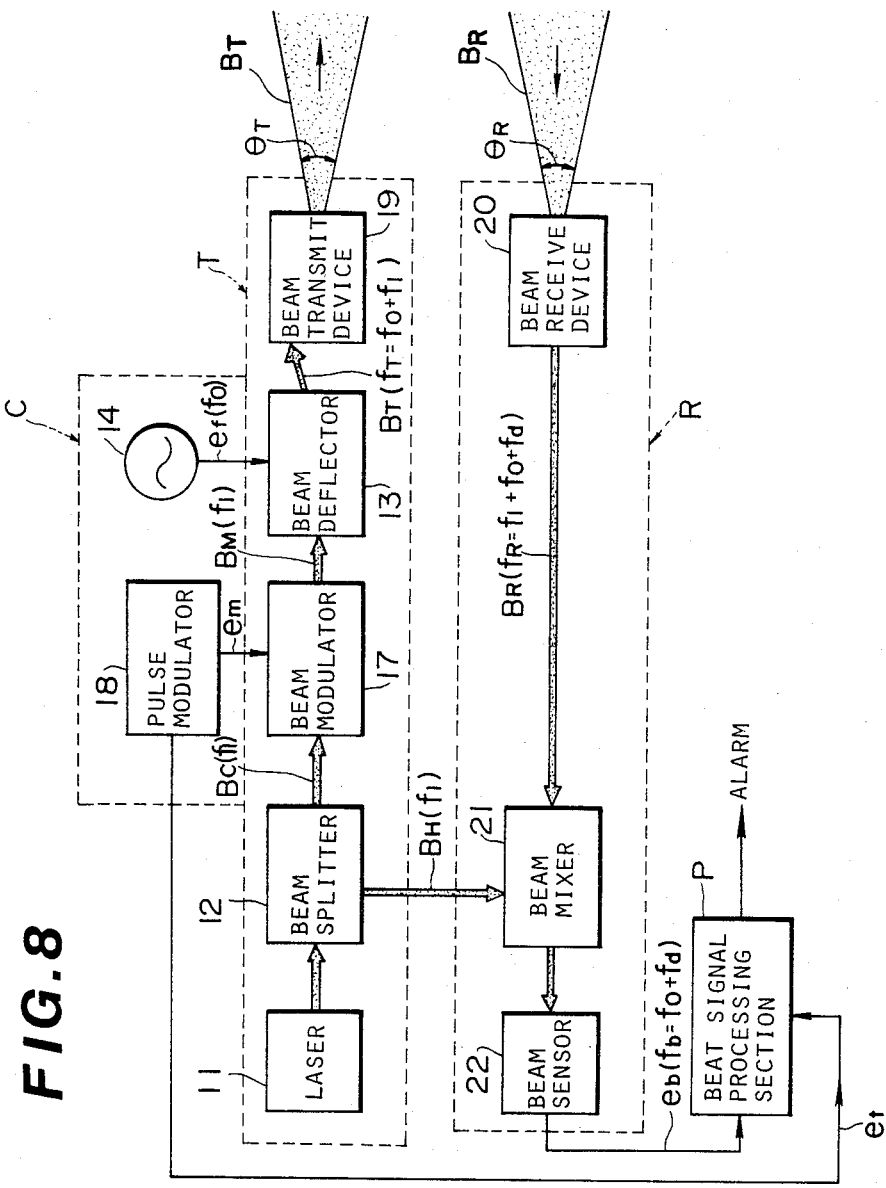
FIG. 8 is a schematic block diagram of a second embodiment of the optical pulse radar for an automotive vehicle according to the present invention.

FIG. 8 shows a schematic block diagram of a second embodiment according to the present invention, in which the beam deflector 13 and the beam modulator 17 shown in FIG. 5 are replaced with each other in the beam transmitting section, with the rest of the system configured in the same way as in FIG. 5.

Figure 9:
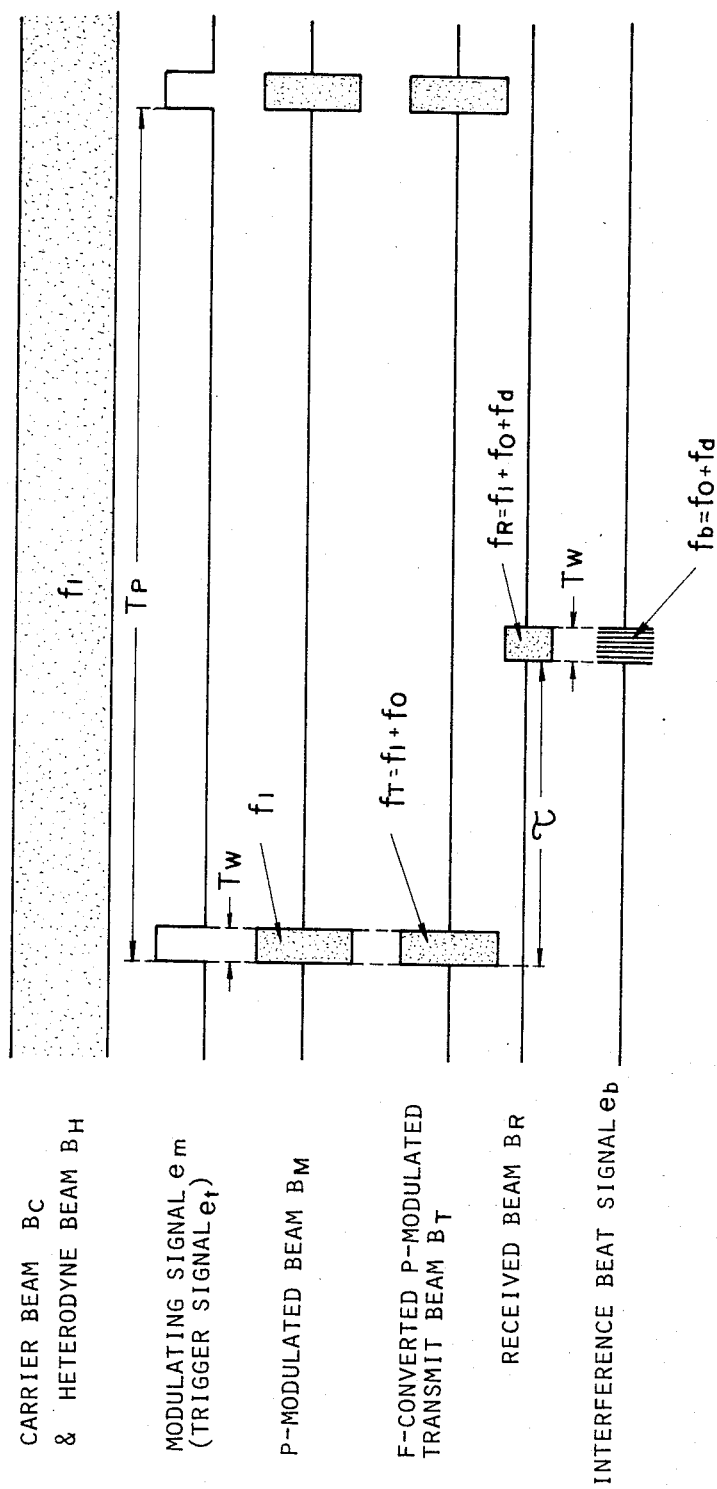
FIG. 9 is a timing chart for the second embodiment of the optical pulse radar for an automotive vehicle according to the present invention of FIG. 8, in which optical and electrical signal waveforms at essential sections are illustrated.

Now, follows the description of the operation of the embodiment of FIG. 8 with reference to the timing chart in FIG. 9 in which optical and electrical signal waveforms at essential sections are illustrated.

The laser 11 outputs a coherent laser beam with a frequency $f_1$ or wavelength $\lambda_1$ and the coherent light is introduced into the beam splitter 12 using a half-silvered mirror, an optically directional coupler or an optical branch in order to split the beam into the heterodyne beam $B_H$ and the carrier beam $B_C$. The carrier $B_C$ is inputted to the beam modulator 17 and is pulse-modulated by the modulating signal $e_m$ with pulse width $T_w$ and period $T_p$ outputted from the pulse modulator 18, so that the pulsed beam $B_M$ with a pulse width $T_w$ is generated. This pulsed beam $B_M$ is introduced into the acoustooptic beam deflector 13 and is deflected in accordance with the high-frequency signal ($f_o=300$ MHz) outputted from the high-frequency generator 14 into a diffracted transmission beam $B_T$ with a frequency $f_T=f_o+f_1$. This transmission beam $B_T$ is introduced into the beam transmitting device 19 and transmitted in the direction in which the vehicle is travelling at dispersion angle $\theta_T$.

On the other hand, the beam reflected from an object is received by the beam receiving device 20 at a reception window angle $\theta_R$ and a received beam $B_R$ of frequency $f_R$ is obtained. The received beam $B_R$ and the heterodyne beam $B_H$ are introduced into the beam mixer 21 to mix the two beams, and then inputted to the beam sensor 22. That is to say, the received beam $B_R$ interferes with the heterodyne beam $B_H$ to produce a beat signal $e_b$ of frequency $f_b$. As in the embodiment of FIG. 5, the frequency $f_b$ is $f=f_o+f_d$, where $f_d$ denotes the Doppler frequency.

This beat signal $e_b$ is inputted to the signal processing section P together with the trigger signal $e_t$ synchronized with the modulating signal $e_m$ from the pulse modulator 18; as in the embodiment of FIG. 5, the propagation delay time $\tau$ of the received beam $B_R$ with respect to the transmitted beam $B_T$ is determined; distance R, relative velocity $V_r$, orientation $\phi$ with respect to the object are calculated; the possiblity of collision with the object on the basis of the current vehicle speed is determined; an audible alarm is produced when necessary.

Also, in the embodiment of FIG. 8, the wavelength bandwidth $\lambda_w$ receivable in the beam receiving section is given by the expression (17) $\lambda_w=5\times10^{-3}$(Å); the background optical noise power is reduced to about 1/2000 of that in the prior-art optical radar; S/N ratio is improved by about 2000 times; it is possible to securely and reliably detect the beam reflected from an object even in the worst background optical noise environment in which sunlight is directly incident upon the optical receiver.

Figure 10:
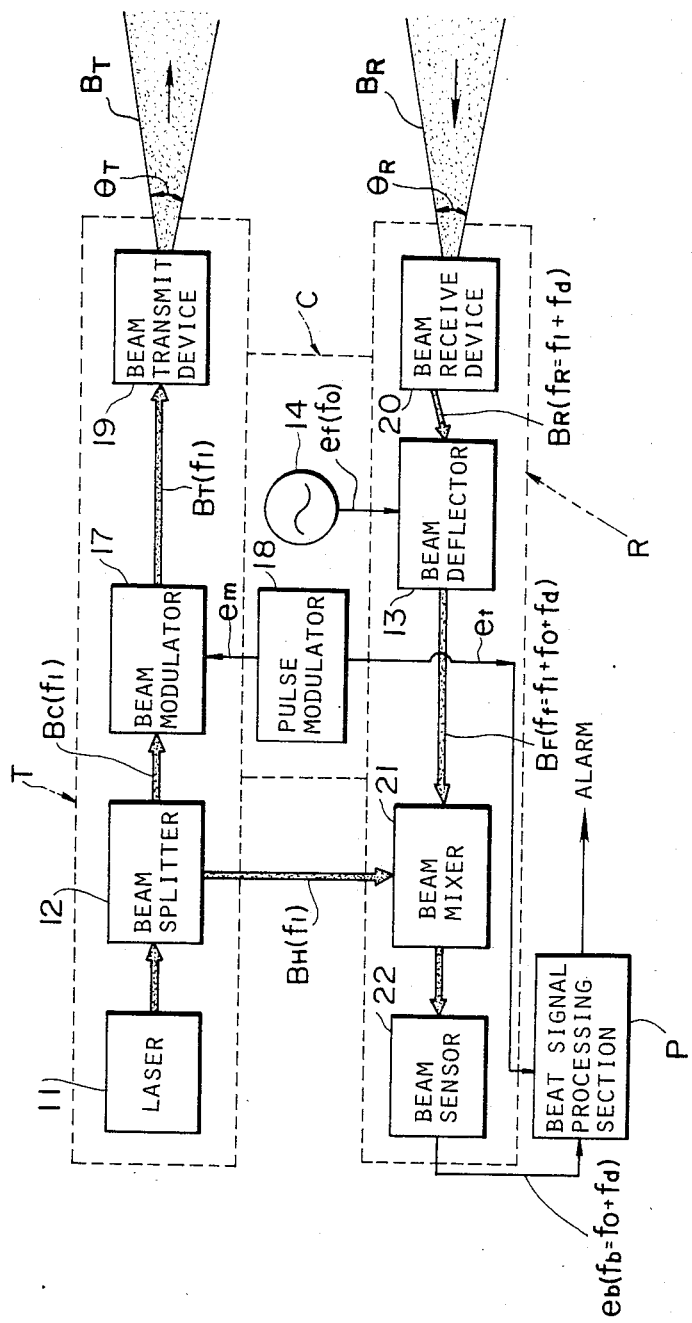
FIG. 10 is a schematic block diagram of a third embodiment of the optical pulse radar for an automotive vehicle according to the present invention.

FIG. 10 shows a schematic block diagram of a third embodiment according to the present invention, in which the beam deflector provided in the beam-transmitting section T of the embodiments shown in FIGS. 5 and 8 is incorporated in the beam receiving section R.

First, the configuration will be explained. There are provided a semiconductor laser 11, a beam splitter 12, a beam modulator 17 and a beam transmitting device 19 in the beam-transmitting section T; whereas there are provided a beam-receiving section 20, an acoustooptic beam deflector 13, a beam mixer 21 and a beam sensor 22 in the beam receiving section R. In the beam-controlling section C, there are provided a high-frequency generator 14 for applying a high-frequency signal with frequency $f_o$ (300 MHz) to the acoustooptic beam deflector 13 in the beam receiving section R and a pulse modulator 18 for applying a modulating signal $e_m$ to the beam modulator 17 provided in the beam transmitting section T. In the signal-processing section P, there are provided an intermediate frequency amplifier, a detector, and an information processing unit as in the embodiment shown in FIG. 5.

Figure 11:
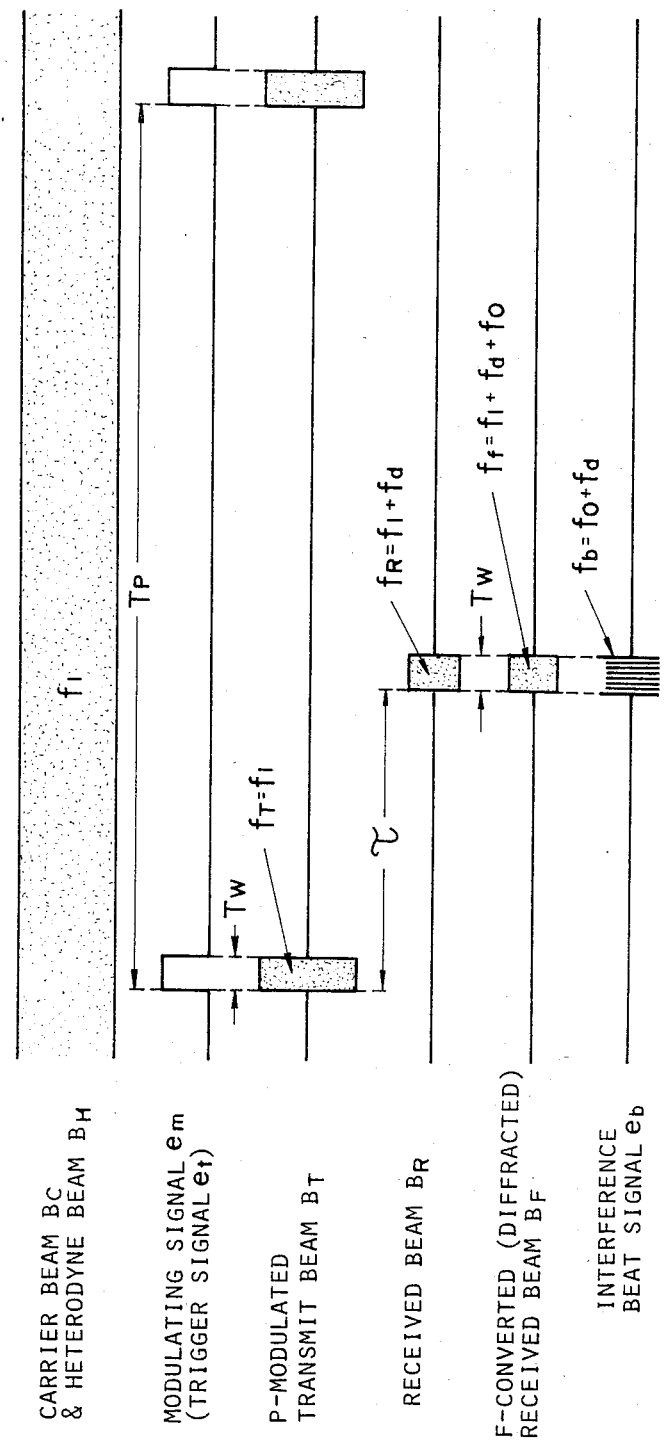
FIG. 11 is a timing chart for the third embodiment of the optical pulse radar for an automotive vehicle according to the present invention of FIG. 9, in which optical and electrical signal waveforms at essential sections are illustrated.

Now, follows a description of the operations of the embodiment shown in FIG. 10 with reference to the timing chart of FIG. 11, in which various optical and electrical signal waveforms at essential junctions are shown.

The semiconductor laser 11 outputs a beam with frequency $f_1$ or wavelength $\lambda_1$; this laser beam is inputted to the beam splitter 12 to be split into a heterodyne beam $B_H$ and carrier beam $B_C$. The carrier beam $B_C$ is inputted to the beam modulator 17, pulse-modulated by the modulating signal $e_m$ with pulse width $T_w$ and period $T_p$ outputted from the pulse modulator 18 to generate the pulsed transmission beam $B_T$ with frequency $f_T=f_1$ transmitted through the beam transmitting device 19 at a dispersion angle $\theta_T$ in the direction in which the vehicle is travelling. The beam reflected from an object is received by the beam receiving device 20 at a reception window angle $\theta_R$ to form the received beam $B_R$ of frequency $f_R$. The received beam $B_R$ is inputted to the acoustooptic beam deflector 13 to deflect the beam $B_R$ in response to the high-frequency signal with frequency $f_o$ (300 MHz) outputted from the high-frequency generator 14, so that a diffracted beam $B_F$ of frequency $f_f=f_R+f_o$ can be obtained. Here, since $f_R=f_1+f_d$ ($f_d$ is Doppler frequency), the frequency $f_f$ is as follows:

$$f_f=f_1+f_o+f_d \qquad (19)$$

The diffracted light $B_F$ obtained by the beam deflector 13 is conducted to the beam mixer 21 together with the heterodyne beam $B_H$ from the beam splitter 12 to mix the two beams; the resultant beam is inputted to the beam sensor 22 to filter and transduce the interference component thereof and thereby obtain a beat signal $e_b$ of frequency $f_b$.

The signal processing section P, to which the beat signal $e_b$ and the trigger signal $e_t$ synchronized with the modulating signal $e_m$ outputted from the pulse modulator 18 are inputted, detects the propagation delay time $\tau$ of the received beam $B_R$ with respect to the transmitted beam $B_T$, calculates distance R, relative speed $V_r$, and orientation $\phi$ with respect to the object as in the embodiment shown in FIG. 5. Furthermore, the possibility of collision against the object can be determined on the basis of the current vehicle speed and an audible alarm can be produced when necessary.

As described above, in the embodiment of FIG. 10, although the beam deflector is shifted from the beam transmitting section to the beam receiving section, the effect is exactly the same as in the embodiment shown in FIG. 5.

Figure 12:
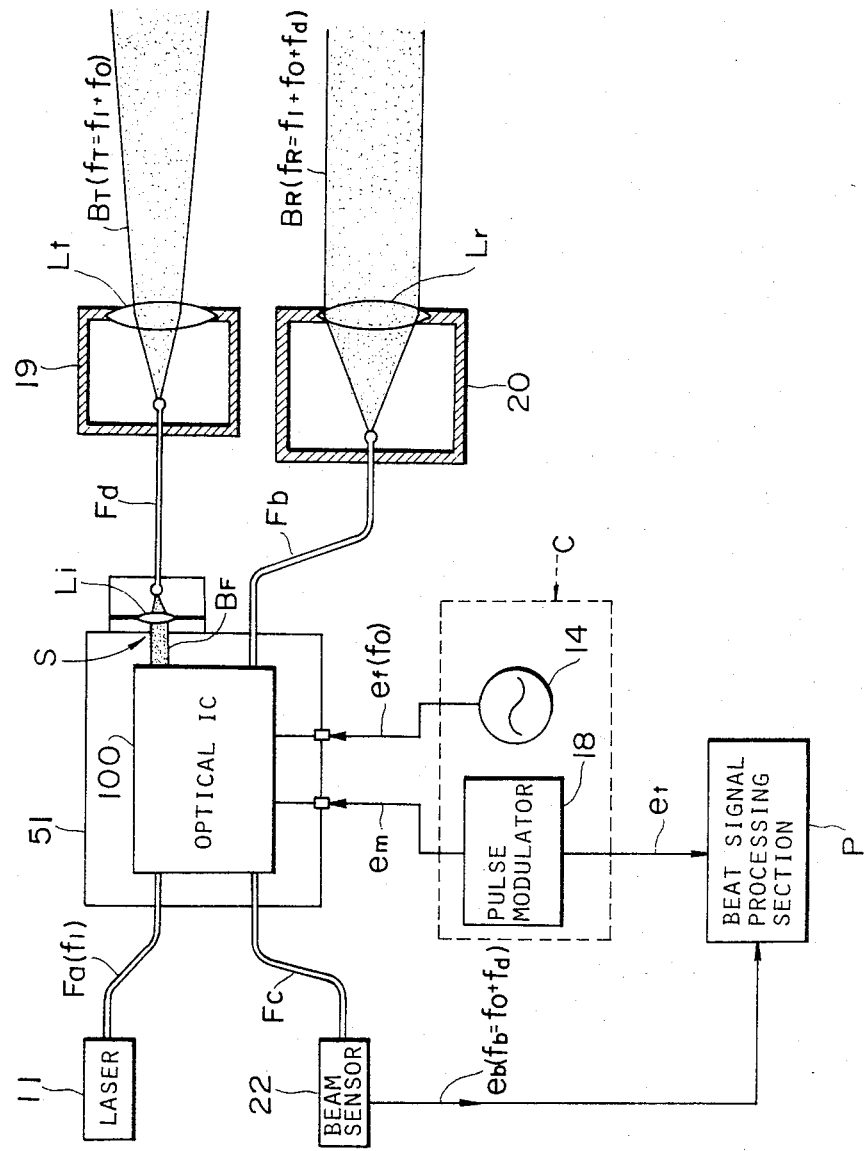
FIG. 12 is a schematic block diagram of a fourth embodiment of the optical pulse radar for an automotive vehicle according to the present invention.

FIG. 12 is a schematic block diagram of a fourth embodiment according to the present invention in which an optical IC is incorporated.

First, the configuration is explained. The reference numeral 11 denotes a semiconductor laser with single-mode oscillation, such as a distributed Bragg reflector-type, distributed feedback-type, integrated twin guide-type, transverse junction stripe-type, terraced substrate-type, which outputs a laser beam with frequency $f_1$ (wavelength $\lambda_1$). The outputted laser beam is conducted to an optical IC 100 housed in a black box 51 (explained later) via a single optical fiber $F_1$. The optical IC 100 distributes the laser beam of frequency $f_1$ into heterodyne beam $B_H$ and carrier beam $B_C$. The carrier beam $B_C$ is pulse-modulated by a modulating signal $e_m$ with a pulse width $T_w$ and period $T_p$ outputted from a pulse modulator 18 and is deflected by the high-frequency signal $e_f$ of frequency $f_o$ (300 MHz) outputted from a high-frequency generator 14 into a pulsed diffracted beam $B_F$ of frequency ($f_T=f_o+f_1$) and a pulsed width $T_w$.

By passing this diffracted beam $B_F$ through a collimator S, the beam $B_F$ is bounded; the delineated beam $B_F$ is focussed by a lens $L_i$ toward a small lens formed at one end of a single optical fiber $F_d$ so as to enter the optical fiber $F_d$. The beam introduced into the optical fiber $F_d$ is then outputted into the beam transmitting device 19, and is transmitted as a transmission beam $B_T$ from a small lens formed at the other end of the optical fiber $F_d$, being transmitted toward the direction in which the vehicle is travelling through a collector lens $L_t$.

The beam reflected from an object is received by a beam receiving device 20 through a focussing lens $L_r$ and is fed to a small lens formed at one end of the single-mode optical fiber $F_b$. The received beam of frequency $f_R$ is introduced into the optical IC 100 via the optical fiber $F_b$, superimposed upon the heterodyne beam $B_H$, conducted to the beam sensor 22 via a single optical fiber $F_c$ and superheterodyned in conjunction with the heterodyne beam $B_H$. The beat signal $e_b$ of a frequency $f_b$ outputted from the beam sensor 22 is inputted to the signal processing section P as in the embodiment shown in FIG. 5. The frequency $f_b$ of the beat signal $e_b$ is given by the expression $f_b = f_o + f_d$ ($f_d$ is Doppler frequency). In the signal processing section P, the distance R, and relative speed $V_r$ with respect to the object are calculated, the possibility of collision with the object is determined, and an audible alarm is produced when necessary.

Figure 13:
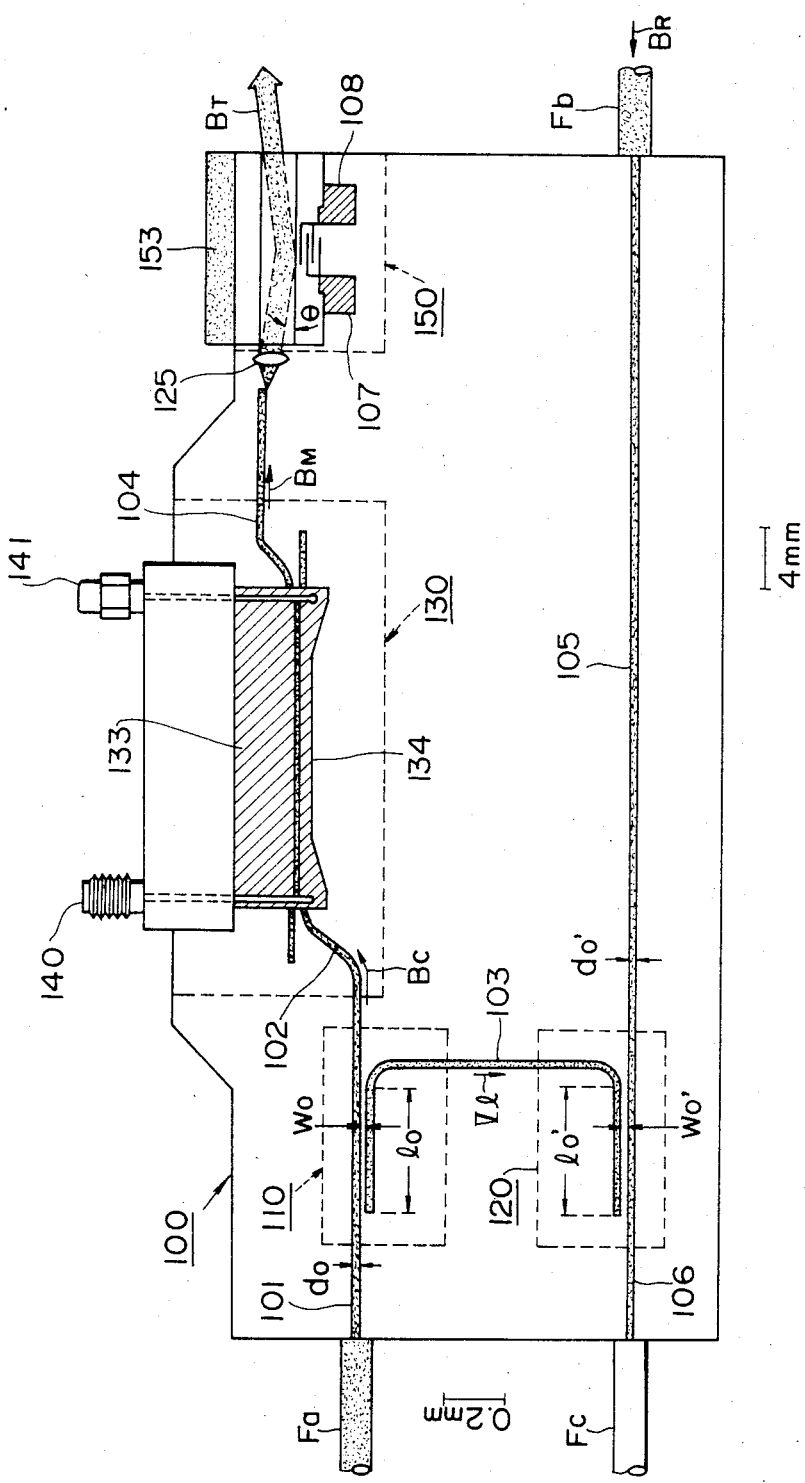
FIG. 13 is an enlarged view of an optical integrated circuit for use in the fourth embodiment of the optical pulse radar for an automotive vehicle according to the present invention of FIG. 12.

FIG. 13 illustrates the configuration of the optical IC 100 shown in FIG. 12. The optical IC 100 comprises a substrate of $LiNbO_3$. The basic optical passageways are optical waveguides with a 8 μm width formed by diffusing Ti (titanium) on the substrate. In addition, two directional couplers 110 and 120, a beam modulator 130, and a beam deflector 150 are formed on the substrate.

The scale of FIG. 13 is magnified and distorted, as can be seen from the horizontal and vertical scale indices, in order to facilitate illustration. Horizontal-to-vertical distortion is about a factor of 20.

The operation is as follows: the beam of frequency $f_1$ outputted from the semiconductor laser 11 is introduced into the optical IC 100 via an optical fiber $F_a$ and is inputted to the directional coupler 110 8 mm in coupling length $l_o$, 8 μm in waveguide width $d_o$, and approximately 5 μm in waveguide separation $W_o$. The beam inputted to the directional coupler 110 is split into a heterodyne beam $B_H$ and a carrier beam $B_C$ transmitted via a waveguides 102 and 103, respectively. The carrier beam $B_C$ is inputted to the beam modulator 130 via the waveguide 102, pulse-modulated by a modulating signal of pulse width $T_w$ and period $T_p$ into a pulsed beam with pulse width $T_w$.

Figure 14:
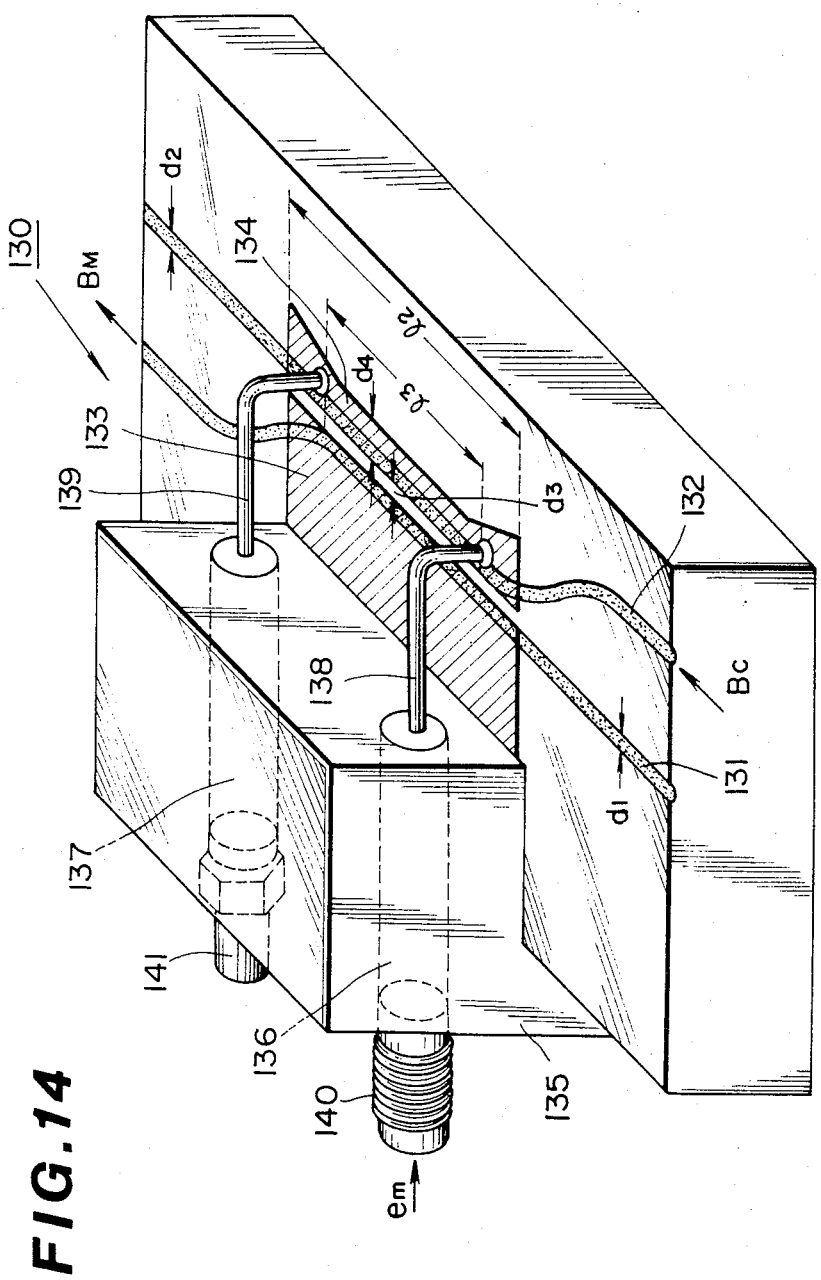
FIG. 14 is an enlarged perspective view showing the configuration of an electrooptic directional coupler type beam modulator used in the optical integrated circuit of FIG. 13.

The details of this beam modulator 130 are shown in FIG. 14.

FIG. 14 shows a directional coupler-type electrooptic beam modulator used as a pulse modulator, in which two titanium (Ti) waveguides 131 and 132 of width $d_1 = d_2 = 8$ μm are diffused onto a $LiNbO_3$ substrate. The length $l_3$ of the coupled portion is approximately 15 mm; the spacing $d_3$ is approximately 5 μm.

On the waveguide 131, there is formed an aluminum grounded electrode 133 with length $l_2$ of approximately 20 mm and thickness $t_1$ of approximately 2 μm; on the waveguide 132, there is formed an aluminum planar electrode 134 with length $l_2$ of approximately 20 mm, thickness $t_2$ of approximately 2 μm, width $d_4$ of approximately 15 μm, and electric impedance $Z_p$ of 50 ohm.

In addition, a 1000 Å-thick layer of $Al_2O_3$ is deposited between the electrodes 133 and 134 and the $LiNbO_3$ substrate for the purpose of optical insulation.

On the grounded electrode 133, an aluminum block 135 is mounted, through which cables 136 and 137 with an electrical impedance of 50 ohm penetrate. A central conductor 138 in the cable 136 and the central conductor 139 in the cable 137 are connected to opposite ends of the planar electrode 134. An optical signal modulating plug 140 is connected to the other end of the cable 136 and a absorbtive cap 141 with an impedance of 50 ohm is connected to the other end of the cable 137.

When a modulation signal pulse $e_m$ is applied to electrode 134, the index of refraction of the $LiNbO_3$ substrate beneath the waveguides is changed such that the substrate refracts the carrier beam $B_C$ to be 180° out of phase or in phase with the fraction of the carrier beam which is normally transferred to waveguide 131 through the gap $d_3$. The refracted, out of phase or in phase with light is then transferred to waveguide 131 where it cancels the normal carrier beam or is superimposed upon the normal carrier beam. As a result, the modulation signal $e_m$ serves as a gating signal to inhibit or pass carrier beam $B_C$ output. The phase between the two beams can be adjusted according to the length $l_3$.

The main characteristics of this beam modulator 130 are a modulation frequency of 1 GHz in the −3 dB bandwidth, an insertion loss of 4 dB, and an optical quenching loss of about 20 dB.

The operation of this beam modulator is dependent upon an electrooptic effect by which the refractive index of the substrate is changed according to the intensity of the electric field applied thereto.

With reference to FIG. 13 again, the modulated beam $B_M$ outputted from the beam modulator 130 is inputted to a thin-film lens 125 via the waveguide 104 to increase the beam transmission width, and a parallel beam with a beam width of about 50 μm is inputted to the beam deflector 150 at an incidence angle θ.

FIG. 15 shows the details of the beam deflector 150 shown in FIG. 13, in which a surface acoustic wave-type acoustooptic beam deflector is used.

In this beam deflector 150, an $As_2S_3$ thin film 151 with a film thickness $h_2$ of approximately 10 μm and a width $W_2$ of 500 μm is formed on the $LiNbO_3$ substrate 158 to serve both as an optical waveguide and an ultrasonic medium. At the boundary between the $LiNbO_3$ substrate 151 and the $As_2S_3$ thin film, an interdigital transducer 152 with a length of $l_1$ of 3 mm is formed to serve as a surface acoustical wave transducer. At the opposite end of the $As_2S_3$ thin-film 151, an ultrasonic acoustical wave absorbing member 153 is formed.

The central portion of the $As_2S_3$ thin film 151, which has a width $W_1$ of 200 μm and a thickness $h_1$ of approximately 1.5 μm, serves as the optical waveguide 154 to transmit carrier beam $B_C$.

The lens 125 transmits to the waveguide 154 a pulsed beam with a width of about 50 μm and a frequency of $f_1$ at an incidence angle θ between the central line G of the waveguide 154 and an optical axis $g_1$ of beam $B_C$. On the other hand, the high-frequency signal with a frequency $f_o$ of about 300 MHz outputted from a high-frequency generator 14 is applied across the interdigital transducer 152 to generate surface accoustic waves 155 which travel across the optical waveguide 154 at a propagation speed $V_s$, and are absorbed by the ultrasonic absorbing member 153. The interdigital transducer 152 is connected to the high-frequency generator 14 via the aluminum electrodes 107 and 108 to which signal wires are connected.

Compression and rarefaction of the $As_2S_3$ film due to the surface waves causes corresponding variations in the index of refraction thereof. As a result, a diffracted beam $B_F$ with an optical axis $g_2$ and with an diffraction angle $\theta$ with respect to the central line G can be obtained, if Bragg diffraction condition as expressed by the following expression is satisfied.

$$\text{if } \theta << 1, \ \theta = (\lambda_1/2) \cdot (f_o/V_A) \quad (20)$$

where $\lambda_1$ denotes the wavelength of the inputted beam with frequency $f_1$, and $V_s$ and $f_o$ denote the propagation speed and frequency of the surface acoustical waves, respectively.

In addition, the frequency $f_T$ of the diffracted beam $B_{F1}$ changes to $f_F = f_o + f_1$. In order to effectively separate the diffracted beam $B_{F1}$ from the transmitted beam $B_C$ with frequency $f_1$ on the optical axis $g_1$, a grating decoupler 157, in the form of a diffraction grating with grating spacing $\Lambda$ is formed on the surface of the far end of the recessed waveguide 154 of the $As_2S_3$ thin film 151. Diffracted beam $B_{F1}$ is again diffracted, but this time in a different plant, to obtain a diffracted beam $B_{F2}$ with an optical axis $g_3$ at a diffraction angle $\psi$ with respect to the surface of the $As_2S_3$ thin film. Further, an angle between the optical axes $g_2$ and $g_3$ is $\psi$ on the surface $S_y$ including points $P_b$, $P_c$, and $P_5$ perpendicular to the surface $S_x$ including points $P_a$, $P_4$ and $P_5$ in parallel with the $As_2S_3$ thin film surface.

Here, the diffracting effect of the grating decoupler 157 can be expressed as follows:

$$\cos \psi = \frac{\lambda_T}{\lambda_{lT}} - m \frac{\lambda_T}{\Lambda} \quad (21)$$

where $\lambda_T$ denote the spatial wavelength of the beam of frequency $f_T$; $\lambda_{lT}$ denotes the wavelength of the beam in the plane of the grating; m is an a positive $\Lambda$ denotes the diffraction grating interval.

In this embodiment, $\Lambda$ is $2\lambda_T$, and $\psi$ is 60 degrees.

The operation of this beam deflector is dependent upon an acoustooptic effect by which the refractive index of the medium through which ultrasonic waves are travelling are changed and thereby the beam incident upon the acoustical medium is diffracted, provided that Bragg condition is satisfied.

With reference to FIG. 12 again, the refracted beam $B_F$ of frequency $f_f$ from the optical beam deflector 150 becomes a transmission beam $B_T$, passing through the collimator S, and is introduced to the lens $L_i$.

On the other hand, the received beam $B_R$ obtained by the beam receiving device 20 shown in FIG. 12 is introduced to the optical IC 100 via the single optical fiber $F_b$ and then inputted to the optical waveguide 105 of the optical IC as shown in FIG. 13.

The received beam $B_R$ and the heterodyne beam $B_H$ are introduced to the directional coupler 120 serving as a beam mixer via the waveguides 103 and 105. The dimensions of the directional coupler 120 are approximately 8 mm in coupling length $l_o'$ of two waveguides, 8 $\mu$m in the waveguide width $d_o'$, and approximately 5 $\mu$m in the waveguide spacing $W_o'$. By the directional coupler 120, the heterodyne beam $B_H$ of frequency $f_o$ is superimposed upon the received beam $B_R$, outputted via the waveguide 106, and the superimposed beam is introduced into the beam sensor 22 via the single optical fiber $F_c$.

In the embodiment according to the present invention in which an optical IC is configured as shown in FIGS. 12, 13, 14 and 15, since a highly-integrated optical IC is used, it is possible to make the entire optical system markedly smaller, with the exception of the beam transmission device and the beam reception device, so that the optical radar system can become small in size and light in weight. In addition, since the beam transmission and reception devices are connected via optical fibers to the main sections, including the optical IC, semiconductor laser, signal processing section, beam controlling section, it is possible to install the main sections somewhere, for instance, within a passenger compartment, where ambient conditions obviate possible damage due to temperature change, vibration etc., thus facilitating the installation of the optical radar system onto a vehicle and improving the reliability of the entire system. Furthermore, in the optical pulse radar according to the present invention, since the essential sections for processing optical signals are incorporated within an optical IC, it is possible to improve mass productability of the system and to reduce the manufacturing cost.

As described above, according to the present invention, the laser beam is split into a heterodyne beam and a carrier beam; the carrier beam is transmitted after pulse modulation and frequency conversion, the received beam obtained by receiving the beam reflected from an object is superheterodyned in conjunction with the heterodyne beam, the interference signal thus produced is processed in order to determine the distance to the object, the relative velocity with respect to the object, and the orientation toward the object. The present invention makes it possible to reduce the reception bandwidth $\lambda_w$ of the optical radar to about 1/2000 of that of a conventional system. Therefore, even under the worst background optical noise conditions in which sunlight is directly incident on the optical receiver, it is possible to stably and reliably detect the reflected beam. In addition, under the normal travelling conditions in which there exists background optical noise to some extent, it is possible to achieve a detection sensitivity about 2000 times better than that of a conventional system. Furthermore, in the pulse radar according to the present invention, since the frequency of the beat signal obtained by superheterodyning the received beam is independent of the wavelength of the laser outputted from the laser source, the frequency of the beat signal obtained as a detected output signal is essentially constant, except for a small influence due to Doppler effect, even if the wavelength of the laser beam fluctuates due to temperature change. Thus, it is possible to reliably detect information such as the distance, relative velocity, or orientation with respect to the object at all times. As explained above, since fluctuations of the wavelength of the laser do not exert any influence upon the frequency of the beat signal to be received and detected, a thermostatic casing used for the conventional system to thermally isolate the laser is not required, thus simplifying the structure of the system. Furthermore, in the conventional system, although the received beam is directly detected by a beam sensor, in this invention since the reflected beam from an object is detected interferometrically, it is possible to improve the minimum reception sensitivity by 10 dB or more as compared with that of the conventional system, and to improve the object-detecting sensitivity by 10 dB or more under dead-darkness travelling conditions in which there exists almost no background optical noise, as compared with the conventional system.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An optical pulse radar for an automotive vehicle for detecting an object outside of the vehicle, which comprises:
    (a) beam transmitting means for generating a coherent beam, splitting the generated beam into a carrier beam $B_C$ and a heterodyne beam $B_H$, deflecting the carrier beam $B_C$ by a frequency $f_o$ in response to a high frequency signal $e_f$ to generate a deflected carrier beam $B_F$ modulating the carrier beam $B_F$ to a pulse laser beam $B_T$ with a pulse width $t_w$ in response to a pulse-modulating signal $e_m$, and transmitting the carrier beam $B_T$ in a predetermined direction at a beam divergence angle $B_T$;
    (b) beam receiving means for receiving the beam transmitting from said beam transmitting means and reflected from the object and mixing the received beam $B_R$ with the herterodyne beam $B_H$, and superheterodyning the mixed beam into a corresponding electrical interference beat signal $e_b$;
    (c) beat signal processing means connected to said beam transmitting means and said beam receiving means for amplifying the beat signal $e_b$ falling within a predetermined frequency bandwidth to generate a detection signal $e_d$ and calculating information with respect to the object on the basis of the trigger signal $e_t$ and the detection signal $e_d$.

2. An optical pulse radar for an automotive vehicle as set forth in claim 1, wherein said beam transmitting means comprises:
    (a) a laser system for generating a coherent beam with frequency $f_1$;
    (b) a beam splitter connected to said laser system optically for splitting the coherent laser beam into a carrier beam $B_C$ and a heterodyne beam $B_H$ and outputting the carrier beam $B_C$ and the heterodyne beam $B_H$, respectively;
    (c) a high-frequency signal generator for outputting a high-frequency signal $e_f$ with frequency $f_o$;
    (d) a beam deflector connected to said beam splitter optically and to said high-frequency signal generator electrically for deflecting the carrier beam $B_C$ in response to the high-frequency signal $e_f$ and outputting a transmission beam $B_T$ with a frequency $f_T = f_1 + f_o$;
    (e) a pulse modulator for outputting a pulse-modulating signal $e_m$;
    (f) a beam modulator connected to said beam deflector optically and said pulse modulator electrically for modulating the carrier beam in response to the pulse-modulating signal $e_m$ and outputting a pulsed transmission beam $B_T$; and
    (g) a beam transmitting device connected to said beam modulator optically for transmitting the transmission carrier beam $B_T$.

3. An optical pulse radar for an automotive vehicle as set forth in claim 1, wherein said beam transmitting means comprises:
    (a) a laser system for generating a coherent beam with frequency $f_1$;
    (b) a beam splitter connected to said laser system optically for splitting the coherent laser beam into a carrier beam $B_C$ and a heterodyne beam $B_H$ and outputting the carrier beam $B_C$ and the heterodyne beam $B_H$;
    (c) a pulse modulator for outputting a pulse-modulating signal $e_m$;
    (d) a beam modulator connected to said beam splitter optically and said pulse modulator electrically for modulating the carrier beam in response to the pulse-modulating signal $e_m$ and outputting a pulsed laser beam $B_M$; and
    (e) a high-frequency signal generator for outputting a high-frequency signal $e_f$ with frequency $f_o$;
    (f) a beam deflector connected to said beam modulator optically and to said high-frequency signal generator electrically for deflecting the modulated carrier beam $B_M$ in response to the high-frequency signal $e_f$ and outputting a transmission carrier beam $B_T$ with a frequency $f_T = f_1 + f_o$;
    (g) a beam transmitting device connected to said beam deflector optically for transmitting the transmission carrier beam $B_T$.

4. An optical pulse radar for an automotive vehicle as set forth in claim 1, wherein said beam receiving means comprises:
    (a) a beam receiving device for receiving the beam reflected from the object;
    (b) a beam mixer connected to said beam transmitting means and said beam receiving device optically for mixing the heterodyne beam $B_H$ and the received beam $B_R$ for interferometric processing; and
    (c) a beam sensor connected to said beam mixer optically for transducing the mixed beam into a corresponding electrical beat signal $e_b$ with frequency $f_b = f_o + f_d$.

5. An optical pulse radar for an automotive vehicle for detecting an object outside of the vehicle, which comprises:
    (a) beam transmitting means for generating a coherent beam, splitting the generated beam into a carrier beam $B_C$ and a heterodyne beam $B_H$, modulating the carrier beam $B_C$ to a pulse laser beam $B_T$ with a pulse width $t_w$ in response to a pulse modulating signal $e_m$, and transmitting the carrier beam $B_T$ in a predetermined direction at a beam divergence angle $B_T$;
    (b) beam receiving means for receiving the beam transmitted from said beam transmitting means and reflected from the object, deflecting the received beam $B_R$ in accordance with a high-frequency signal $e_f$, mixing the deflected beam $B_F$ with the heterodyne beam $B_H$, and superheterodyning the mixing beam into a corresponding electric beat signal $e_b$; and
    (c) beat signal processing means connected to said beam transmitting means and said beam receiving means for amplifying the beat signal $e_b$ falling within a predetermined frequency bandwidth to generate a detection signal $e_d$ and calculating information with respect to the object on the basis of the trigger signal $e_t$ and the detection signal $e_d$.

6. An optical pulse radar for an automotive vehicle as set forth in claim 5, wherein said beam transmitting means comprises:
    (a) a laser system for generating a coherent beam with frequency $f_1$;

(b) a beam splitter connected to said laser system optically for splitting the coherent laser beam into a carrier beam $B_C$ and a heterodyne beam $B_H$ and outputting the carrier beam $B_C$ and the heterodyne beam $B_H$;
(c) a pulse modulator for outputting a pulse-modulating signal $e_m$; and
(d) a beam modulator connected to said beam splitter optically and said pulse modulator electrically for modulating the carrier beam in response to the pulse-modulating signal $e_m$ and outputting a pulsed transmission beam $B_T$; and
(e) a beam transmitting device connected to said beam modulator optically for transmitting the transmission carrier beam $B_T$.

7. An optical pulse radar for an automotive vehicle as set forth in claim 5, wherein said beam receiving means comprises:
   (a) a beam receiving device for receiving the beam reflected from the object;
   (b) a high-frequency signal generator for outputting a high-frequency signal $e_f$ with frequency $f_o$;
   (c) a beam deflector connected to said beam receiving device optically and to said high-frequency signal generator electrically for deflecting the received beam $B_R$ in response to the high-frequency signal $e_f$ and outputting a frequency-converted beam $B_F$ with frequency $f_f = f_1 + f_o$;
   (d) a beam mixer connected to said beam transmitting means and said beam deflector optically for mixing the heterodyne beam $B_H$ and the frequency-converted received beam $B_F$ for interferometric processing; and
   (e) a beam sensor connected to said beam mixer optically for transducing the mixed beam into a corresponding electric beat signal $e_b$ with a frequency $f_b = (f_o + f_d)$.

8. An optical pulse radar for an automotive vehicle as set forth in claim 1, wherein said beat signal processing means comprises:
   (a) an intermediate-frequency amplifier connected to a beam sensor, a central frequency $f_o$ of which is the same as that of the high-frequency signal $e_f$, for amplifying the beat signal $e_b$ and outputting signals corresponding thereto;
   (b) a detector connected to said intermediate-frequency amplifier for detecting the amplified beat signal and outputting detection signal $e_d$ corresponding thereto;
   (c) a vehicle speed sensor for detecting an absolute vehicle speed and outputting a signal $V_a$ corresponding thereto; and
   (d) a data processing unit connected to said detector, said beam transmitting means, and said vehicle speed sensor for calculating a distance from the present vehicle position to an object, the relative vehicle velocity with respect to an object, and the direction to the object on the basis of the trigger signal $e_t$ outputted from said beam transmitting means in synchronization with the pulse-modulating signal $e_m$, the detector signal $e_d$ from said detector, and the absolute vehicle speed signal $V_a$, and outputting an audible alarm when the calculated distance between the vehicle and the object is below a predetermined reference value.

9. An optical pulse radar for an automotive vehicle for detecting an object outside of the vehicle, which comprises:
   (a) a laser system for generating a coherent beam with a frequency $f_1$;
   (b) a pulse moderator for outputting a pulse-modulating signal $e_m$;
   (c) a high-frequency signal generator for outputting a high-frequency signal $e_f$ with a frequency $f_o$;
   (d) a beam transmitting device for transmitting a transmission beam $B_T$ in a predetermined direction;
   (e) a beam receiving device for receiving the beam $B_R$ transmitted from said beam transmitting device and reflected from the object ahead of the vehicle;
   (f) a beam sensor for transducing a laser beam signal into a corresponding electrical signal;
   (g) an optical integrated circuit connected to said laser system, said beam transmitting device, said beam receiving device, and said beam sensor optically and connected to said pulse modulator and said high-frequency signal generator electrically, for splitting the coherent laser beam outputted from said laser system into a carrier beam $B_C$ and a heterodyne beam $B_H$, for deflecting the carrier beam $B_C$ into a pulsed carrier beam $B_M$ in response to a pulse-modulating signal $e_m$ outputted from said pulse modulator, deflecting the pulsed carrier beam $B_M$ with frequency $f_1$ into a pulsed transmission beam with frequency $(f_1 + f_o)$ in response to the high-frequency signal $e_f$, for transmitting a pulsed transmission beam with frequency $(f_1 + f_o)$ via said beam transmitting device in a predetermined direction, for receiving a beam $B_R$ with frequency $(f_1 + f_o + f_d)$ from said beam receiving device, for mixing the received laser beam $B_R$ with the heterodyne beam $B_H$ for interferometric processing, and for outputting the mixed beam to said beam sensor for superheterodyning the mixed beam into a corresponding electric signal $e_b$ with a frequency $(f_o + f_d)$, and
   (h) a heat signal processing section connected to said beam sensor and said pulse modulator for amplifying the beat signal $e_b$ falling within a predetermined frequency bandwidth, processing the amplified beat signal to generate a detection signal $e_d$ and calculating a distance from the present vehicle position to an object, the relative vehicle velocity with respect to an object, and the orientation to the object on the basis of a trigger signal $e_t$ outputted from said pulse modulator in synchronization with the pulse-modulating signal $e_m$, a detection signal $e_d$ and the current vehicle speed $V_a$.

10. An optical pulse radar for an automotive vehicle as set forth in claim 9, wherein said optical integrated circuit comprises:
   (a) a combined directional coupler-type beam splitter and beam mixer having:
      (1) a first optical waveguide, one end of which is connected to said laser system optically to conduct the laser beam as the carrier beam $B_C$;
      (2) a U-shaped second optical waveguide, one straight portion of which is disposed adjacent parallel to said first optical waveguide with a predetermined distance therebetween for receiving part of the laser beam introduced to said first optical waveguide, to generate the heterodyne beam $B_H$; and
      (3) a third optical waveguide, one end of which is connected to said beam sensor and the other end of which is connected to said beam receiving device optically, the other straight portion of said U-shaped second optical waveguide being disposed near and parallel to said third optical waveguide with a predetermined distance therebetween for mixing the heterodyne beam $B_H$ introduced to said U-shaped second optical waveguide with the received laser beam $B_R$ introduced to said third optical waveguide via said beam receiving device to generate a beat beam;

(b) a beam modulator having:
  (1) a fourth waveguide one end of which is connected to said first optical waveguide directly for receiving the carrier beam $B_C$;
  (2) a fifth waveguide disposed near and parallel to said fourth waveguide for transmitting the pulsed transmission beam $B_T$;
  (3) a planar electrode formed on said fourth waveguide;
  (4) a grounded electrode formed on said fifth waveguide;
  (5) a pair of conductors connected to said planar electrode at an appropriate distance therebetween and to said pulse modulator for applying the pulse-modulating signal $e_m$ to said planar electrode, whereby transmission of transmitted beam $B_T$ is prevented or passed in response to pulses of the pulse-modulating signal $e_m$; and (c) a beam deflector having:
  (1) a thin film serving as an optical waveguide and a high-frequency acoustical signal medium;
  (2) a transducer in contact with said thin film and connected to said high-frequency signal generator for transducing the high-frequency signal $e_f$ with a frequency $f_o$ into corresponding acoustical waves and transmitting the waves through said thin film; and
  (3) a recessed waveguide formed at the center of said thin film for conducting a laser beam with frequency $f_1$ therethrough in a direction perpendicular to the propagation of the acoustical waves so as to convert the incident beam into a frequency-converted laser beam $B_{F1}$ with a frequency $(f_1+f_o)$; and
  (4) a grating decoupler formed on said recessed waveguide for diffracting the frequency-converted laser beam $B_{F1}$.

11. A method of detecting an object ahead of an automotive vehicle, which comprises the following steps of:
(a) generating a coherent beam with frequency $f_1$;
(b) splitting the coherent laser beam into a carrier beam $B_C$ and a heterodyne beam $B_H$;
(c) deflecting the frequency of the carrier beam $B_C$ in response to a high-frequency signal $e_f$ with a frequency $f_o$ into a frequency-converted beam $B_F$ with frequency $(f_1+f_o)$;
(d) modulating the frequency-converted beam $B_F$ in response to a pulse-modulating signal $e_m$ into a transmission beam $B_T$;
(e) transmitting the transmission beam $B_T$;
(f) receiving the beam with a frequency $(f_1+f_o+f_d)$ after transmission and reflection from the object;
(g) mixing the received beam $B_R$ with the heterodyne beam to obtain a beat beam;
(h) transducing the mixed beat beam into the corresponding electric beam signal $e_b$ with frequency $(f_o+f_d)$;
(i) calculating a distance to an object, the relative vehicle velocity with respect to the object, and a direction to the object on the basis of a trigger signal $e_t$ outputted in synchronization with the pulse-modulated signal $e_m$, the transduced beat signal $e_b$, and the current vehicle speed $V_a$.

12. A method of detecting an object ahead of an automotive vehicle, which comprises the following steps of:
(a) generating a coherent beam with a frequency $f_1$;
(b) splitting the coherent laser beam into a carrier beam $B_C$ and a heterodyne beam $B_H$;
(c) modulating the the carrier beam $B_C$ in response to a pulse-modulating signal $e_m$ into a pulse-modulated transmission beam $B_T$;
(d) transmitting the transmission beam $B_T$;
(e) receiving the beam $B_R$ with a frequency $(f_1+f_d)$ after transmission and reflection from the object;
(f) modulating the frequency of the received beam $B_R$ in rsponse to a high-frequency signal $e_f$ with frequency $f_o$ into a frequency-converted beam $B_F$ with frequency $(f_1+f_o+f_d)$;
(g) mixing the frequency-converted beam $B_F$ with the heterodyne beam to obtain a beat beam;
(h) transducing the mixed beat beam into the corresponding electric beam signal $e_b$ with frequency $(f_o+f_d)$;
(i) calculating a distance to an object, the relative vehicle velocity with respect to the object, and a direction to the object on the basis of a trigger signal $e_t$ outputted in synchronization with the pulse-modulated signal $e_m$, the transduced beat signal $e_b$, and the current vehicle speed $V_a$.

13. A method of detecting an object ahead of an automotive vehicle as set forth in claim 11, wherein the step of splitting the coherent laser beam into the carrier beam and the heterodyne beam and the step of mixing the received beam with the heterodyne beam are performed by means of optical directional coupling.

14. A method of detecting an object ahead of an automotive vehicle as set forth in claim 11, wherein the step of modulating the carrier beam into a pulsed transmission beam is performed by means of an electrooptical effect by which the refractive index of a medium through which the beam is travelling can be changed according to an intensity of an electric field applied to the medium.

15. A method of detecting an object ahead of an automotive vehicle as set forth in claim 11, wherein the step of deflecting the carrier beam is performed by means of an acoustooptical effect by which the refractive index of a medium through which the beam is travelling can be changed by surface compressional acoustical waves and thereby the beam incident upon the medium, at an angle satisfying Bragg condition is diffracted and boosted by a frequency equal to the frequency of the acoustical waves.

* * * * *